US012652093B2

(12) United States Patent
Wu et al.

(10) Patent No.: US 12,652,093 B2
(45) Date of Patent: Jun. 9, 2026

(54) PORT SELECTION CODEBOOK ENHANCEMENTS FOR SPATIAL AND FREQUENCY DOMAIN DENSITY RECIPROCITY

(71) Applicant: QUALCOMM Incorporated, San Diego, CA (US)

(72) Inventors: Liangming Wu, Beijing (CN); Chenxi Hao, Beijing (CN); Yu Zhang, San Diego, CA (US); Kangqi Liu, San Diego, CA (US); Min Huang, Beijing (CN); Rui Hu, Beijing (CN); Qiaoyu Li, Beijing (CN); Chao Wei, Beijing (CN); Hao Xu, Beijing (CN); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 739 days.

(21) Appl. No.: 18/005,939

(22) PCT Filed: Sep. 9, 2020

(86) PCT No.: PCT/CN2020/114241
§ 371 (c)(1),
(2) Date: Jan. 18, 2023

(87) PCT Pub. No.: WO2022/051941
PCT Pub. Date: Mar. 17, 2022

(65) Prior Publication Data
US 2023/0170963 A1     Jun. 1, 2023

(51) Int. Cl.
*H04B 7/06* (2006.01)
*H04W 72/23* (2023.01)

(52) U.S. Cl.
CPC ....... *H04B 7/0626* (2013.01); *H04B 7/06966* (2023.05); *H04W 72/23* (2023.01)

(58) Field of Classification Search
CPC .............. H04B 7/0626; H04B 7/06966; H04B 7/0452; H04B 7/0482; H04W 72/23
See application file for complete search history.

(56) References Cited

U.S. PATENT DOCUMENTS

2019/0068343 A1     2/2019  Kwak et al.
2019/0326974 A1    10/2019  Li et al.
(Continued)

FOREIGN PATENT DOCUMENTS

CN      111314034 A     6/2020
CN      111431570 A     7/2020

OTHER PUBLICATIONS

Huawei, et al., "General Framework for CSI Acquisition and Beam Management," 3GPP TSG RAN WG1 Meeting #90, R1-1712226, Prague, Czech Republic, Aug. 21-25, 2017, (Aug. 25, 2017), the whole document, 10 pages.
(Continued)

*Primary Examiner* — Habte Mered
(74) *Attorney, Agent, or Firm* — NORTON ROSE FULBRIGHT US LLP

(57) ABSTRACT

Port selection codebook enhancements are disclosed for spatial and frequency domain density (FDD) reciprocity. A base station may generate and signal a channel state information (CSI) report configuration including configuration of multiple CSI-reference signal (CSI-RS) port groups, wherein each group includes one or more CSI-RS ports, and each group is associated with one or more codebook subset restrictions (CBSRs). Using the configured restrictions of the CBSRs, served user equipments (UEs) may determine linear combination coefficient feedback based on channel measurements of selected port groups and signals the feedback to the base station. Once the base station receives the feedback it may then determine a hybrid CSI-RS codebook using both the configured CSI-RS port groups and the linear
(Continued)

500 — Receive a CSI report configuration including configuration of multiple CSI-RS port groups, each including one or more CSI-RS ports, and each associated with one or more CBSR.

501 — Determine one or more linear combination coefficients according to the associated CBSR and based on channel measurements of one or more of the configured CSI-RS port groups.

502 — Report a CSI report to the serving base station including the determined linear combination coefficients.

combination coefficients. The base station may then transmit downlink data encoded with a precoding matrix selected from the codebook. Other aspects and features are also claimed and described.

33 Claims, 9 Drawing Sheets

(56)                         References Cited

U.S. PATENT DOCUMENTS

| | | | | |
|---|---|---|---|---|
| 2020/0186207 | A1* | 6/2020 | Davydov | H04B 7/0658 |
| 2020/0220591 | A1* | 7/2020 | Zhang | H04B 7/0456 |
| 2021/0367655 | A1* | 11/2021 | Jiang | H04L 25/0226 |
| 2022/0166486 | A1* | 5/2022 | Sun | H04B 7/06966 |
| 2022/0287059 | A1* | 9/2022 | Huang | H04W 52/146 |
| 2022/0295322 | A1* | 9/2022 | Haghighat | H04B 7/0413 |
| 2022/0385344 | A1* | 12/2022 | Großmann | H04B 7/0478 |
| 2025/0142492 | A1* | 5/2025 | Faxér | H04B 7/0634 |

OTHER PUBLICATIONS

International Search Report and Written Opinion—PCT/CN2020/114241—ISA/EPO—Jun. 9, 2021.

* cited by examiner

FIG. 1

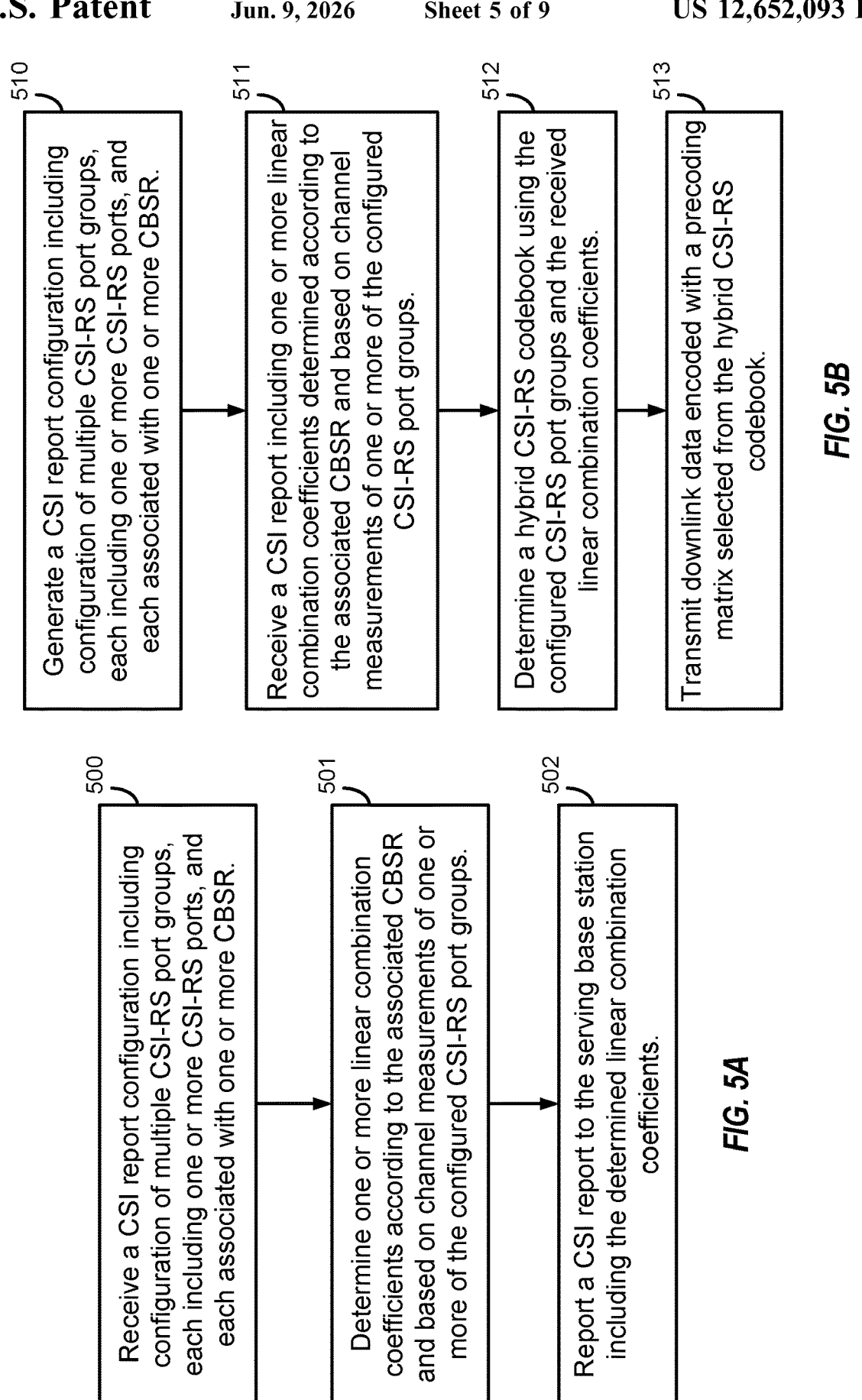

510　Generate a CSI report configuration including configuration of multiple CSI-RS port groups, each including one or more CSI-RS ports, and each associated with one or more CBSR.

511　Receive a CSI report including one or more linear combination coefficients determined according to the associated CBSR and based on channel measurements of one or more of the configured CSI-RS port groups.

512　Determine a hybrid CSI-RS codebook using the configured CSI-RS port groups and the received linear combination coefficients.

513　Transmit downlink data encoded with a precoding matrix selected from the hybrid CSI-RS codebook.

*FIG. 5B*

500　Receive a CSI report configuration including configuration of multiple CSI-RS port groups, each including one or more CSI-RS ports, and each associated with one or more CBSR.

501　Determine one or more linear combination coefficients according to the associated CBSR and based on channel measurements of one or more of the configured CSI-RS port groups.

502　Report a CSI report to the serving base station including the determined linear combination coefficients.

*FIG. 5A*

PORT SELECTION CODEBOOK ENHANCEMENTS FOR SPATIAL AND FREQUENCY DOMAIN DENSITY RECIPROCITY

CROSS-REFERENCE TO RELATED APPLICATIONS

This application claims the benefit of International Patent Application No. PCT/CN2020/114241, entitled, "PORT SELECTION CODEBOOK ENHANCEMENTS FOR SPATIAL AND FREQUENCY DOMAIN DENSITY RECIPROCITY," filed on Sep. 9, 2020, which is expressly incorporated by reference herein in its entirety.

TECHNICAL FIELD

Aspects of the present disclosure relate generally to wireless communication systems, and more particularly, to codebook configurations for signal transmissions. Certain embodiments of the technology discussed below can enable and provide port selection codebook enhancements for spatial and frequency domain density (FDD) reciprocity.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes receiving, by a UE, a channel state information (CSI) report configuration from a serving base station, wherein the CSI report configuration includes configuration of a plurality of CSI-reference signal (CSI-RS) port groups, each CSI-RS port group of the plurality of CSI-RS port groups including one or more CSI-RS ports, and wherein each CSI-RS port group is associated with one or more codebook subset restrictions (CBSR), determining, by the UE, one or more linear combination coefficients based on channel measurements of one or more CSI-RS port groups of the plurality of CSI-RS port groups, wherein the one or more linear combination coefficients are determined according to the one or more CBSR associated with the one or more CSI-RS port groups; and reporting, by the UE, a CSI report to the serving base station, wherein the CSI report includes the one or more linear combination coefficients.

In an additional aspect of the disclosure, a method of wireless communication includes generating, by a base station, a CSI report configuration for one or more served UEs, wherein the CSI report configuration includes configuration of a plurality of CSI-RS port groups, each CSI-RS port group of the plurality of CSI-RS port groups including one or more CSI-RS ports, and wherein each CSI-RS port group is associated with one or more CBSR, receiving, by the base station, a CSI report including one or more linear combination coefficients from the one or more served UEs based on channel measurements of one or more CSI-RS port groups of the plurality of CSI-RS port groups determined according to the one or more CBSR associated with the one or more CSI-RS port groups, determining, by the base station, a hybrid CSI-RS codebook using the plurality of CSI-RS port groups and the one or more linear combination coefficients, and transmitting, by the base station, downlink data encoded with a precoding matrix selected from the hybrid CSI-RS codebook.

In an additional aspect of the disclosure, an apparatus configured for wireless communications includes means for receiving, by a UE, a CSI report configuration from a serving base station, wherein the CSI report configuration includes configuration of a plurality of CSI-RS port groups, each CSI-RS port group of the plurality of CSI-RS port groups including one or more CSI-RS ports, and wherein each CSI-RS port group is associated with one or more CBSR, means for determining, by the UE, one or more linear combination coefficients based on channel measurements of one or more CSI-RS port groups of the plurality of CSI-RS port groups, wherein the one or more linear combination coefficients are determined according to the one or more CBSR associated with the one or more CSI-RS port groups; and means for reporting, by the UE, a CSI report to the serving base station, wherein the CSI report includes the one or more linear combination coefficients.

In an additional aspect of the disclosure, an apparatus configured for wireless communications includes means for generating, by a base station, a CSI report configuration for one or more served UEs, wherein the CSI report configuration includes configuration of a plurality of CSI-RS port groups, each CSI-RS port group of the plurality of CSI-RS port groups including one or more CSI-RS ports, and wherein each CSI-RS port group is associated with one or more CBSR, means for receiving, by the base station, a CSI report including one or more linear combination coefficients from the one or more served UEs based on channel measurements of one or more CSI-RS port groups of the plurality of CSI-RS port groups determined according to the one or more CBSR associated with the one or more CSI-RS port groups, means for determining, by the base station, a hybrid CSI-RS codebook using the plurality of CSI-RS port groups and the one or more linear combination coefficients, and means for transmitting, by the base station, downlink data encoded with a precoding matrix selected from the hybrid CSI-RS codebook.

In an additional aspect of the disclosure, a non-transitory computer-readable medium having program code recorded thereon. The program code further includes code to receive, by a UE, a CSI report configuration from a serving base station, wherein the CSI report configuration includes configuration of a plurality of CSI-RS port groups, each CSI-RS port group of the plurality of CSI-RS port groups including one or more CSI-RS ports, and wherein each CSI-RS port group is associated with one or more CBSR, code to determine, by the UE, one or more linear combination coefficients based on channel measurements of one or more CSI-RS port groups of the plurality of CSI-RS port groups, wherein the one or more linear combination coefficients are determined according to the one or more CBSR associated with the one or more CSI-RS port groups; and code to report, by the UE, a CSI report to the serving base station, wherein the CSI report includes the one or more linear combination coefficients.

In an additional aspect of the disclosure, a non-transitory computer-readable medium having program code recorded thereon. The program code further includes code to generate, by a base station, a CSI report configuration for one or more served UEs, wherein the CSI report configuration includes configuration of a plurality of CSI-RS port groups, each CSI-RS port group of the plurality of CSI-RS port groups including one or more CSI-RS ports, and wherein each CSI-RS port group is associated with one or more CBSR, code to receive, by the base station, a CSI report including one or more linear combination coefficients from the one or more served UEs based on channel measurements of one or more CSI-RS port groups of the plurality of CSI-RS port groups determined according to the one or more CBSR associated with the one or more CSI-RS port groups, code to determine, by the base station, a hybrid CSI-RS codebook using the plurality of CSI-RS port groups and the one or more linear combination coefficients, and code to transmit, by the base station, downlink data encoded with a precoding matrix selected from the hybrid CSI-RS codebook.

In an additional aspect of the disclosure, an apparatus configured for wireless communication is disclosed. The apparatus includes at least one processor, and a memory coupled to the processor. The processor is configured to receive, by a UE, a CSI report configuration from a serving base station, wherein the CSI report configuration includes configuration of a plurality of CSI-RS port groups, each CSI-RS port group of the plurality of CSI-RS port groups including one or more CSI-RS ports, and wherein each CSI-RS port group is associated with one or more CBSR, to determine, by the UE, one or more linear combination coefficients based on channel measurements of one or more CSI-RS port groups of the plurality of CSI-RS port groups, wherein the one or more linear combination coefficients are determined according to the one or more CBSR associated with the one or more CSI-RS port groups; and to report, by the UE, a CSI report to the serving base station, wherein the CSI report includes the one or more linear combination coefficients.

In an additional aspect of the disclosure, an apparatus configured for wireless communication is disclosed. The apparatus includes at least one processor, and a memory coupled to the processor. The processor is configured to generate, by a base station, a CSI report configuration for one or more served UEs, wherein the CSI report configuration includes configuration of a plurality of CSI-RS port groups, each CSI-RS port group of the plurality of CSI-RS port groups including one or more CSI-RS ports, and wherein each CSI-RS port group is associated with one or more CBSR, to receive, by the base station, a CSI report including one or more linear combination coefficients from the one or more served UEs based on channel measurements of one or more CSI-RS port groups of the plurality of CSI-RS port groups determined according to the one or more CBSR associated with the one or more CSI-RS port groups, to determine, by the base station, a hybrid CSI-RS codebook using the plurality of CSI-RS port groups and the one or more linear combination coefficients, and to transmit, by the base station, downlink data encoded with a precoding matrix selected from the hybrid CSI-RS codebook.

Other aspects, features, and embodiments will become apparent to those of ordinary skill in the art, upon reviewing the following description of specific, exemplary embodiments in conjunction with the accompanying figures. While features may be discussed relative to certain aspects and figures below, all embodiments can include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 1 is a block diagram illustrating an example of a system for wireless communications that supports port selection codebook enhancements for spatial and frequency domain density (FDD) reciprocity in accordance with aspects of the present disclosure.

FIGS. 5A and 5B are block diagrams illustrating example blocks executed to implement one aspect of the present disclosure.

Figure 2:
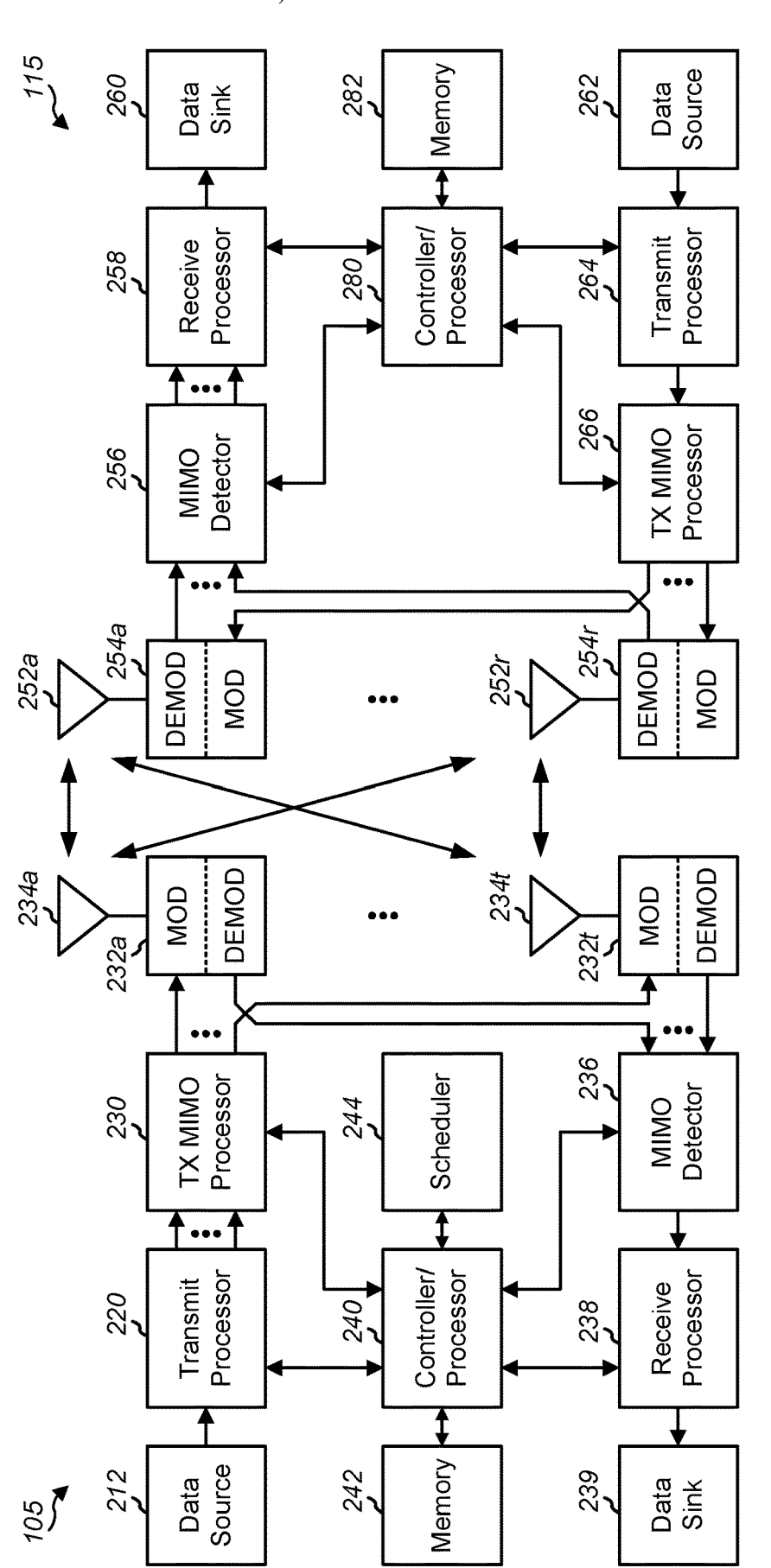
FIG. 2 is a block diagram illustrating a design of a base station and a UE that supports port selection codebook enhancements for spatial and FDD reciprocity according to one aspect of the present disclosure.

The Appendix provides further details regarding various embodiments of this disclosure and the subject matter therein forms a part of the specification of this application.

DETAILED DESCRIPTION

The detailed description set forth below, in connection with the appended drawings and appendix, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Some wireless communications systems, such as New Radio (NR)/5G systems, may use multiple antennas at the transmitter and receiver sides in order to provide diversity against fading, improve beamforming, enable spatial multiplexing, and suppress interference, for example. A precoder matrix may be a transmission matrix that is applied to the signals to be transmitted, which results in multi-antenna precoding. The precoding may be applied to reference signals, such as channel state information reference signals (CSI-RS) for downlink channel sounding or sounding reference signals (SRSs) for uplink channel sounding. Channel sounding is a technique used to evaluate a radio environment in wireless communications.

A UE may provide a channel state information (CSI) report to a base station with information related to the channel conditions and precoding. The CSI report may include a Precoder Matrix Indicator (PMI) that indicates a suitable precoder matrix based on a selected transmission rank and a Channel-Quality Indicator (CQI) that indicates a suitable channel-coding rate and modulation scheme based at least in part on the selected precoder matrix.

The PMI reported by the UE indicates a suitable precoder matrix for the base station to use for downlink transmission to the device. A specific PMI value corresponds to one specific precoder matrix. A set of possible PMI values correspond to a set of different precoder matrices which are defined in a precoder codebook. The UE selects the PMI based on a number of antenna ports of the CSI-RS and the selected rank. There may be at least one codebook for each valid combination of antenna ports and rank.

However, the base station may or may not use the precoder indicated by the PMI for downlink transmissions. For example, the base station may decide to use a different precoder in an MU-MIMO scenario. In MU-MIMO, the transmitter may use multi-antenna precoding to enable simultaneous downlink transmissions to multiple UEs or other devices using the same time and frequency resources. In MU-MIMO, a precoding matrix may be selected in order to focus energy to the target device while also limiting interference with other simultaneously scheduled devices. Because of using MU-MIMO, the CSI may be a Type II CSI that is mostly for MU-MIMO scenarios. Type II CSI may also use Type II codebooks, which may allow for the PMI to provide channel information with higher spatial granularity than Type I codebooks, which are mainly for scenarios without MU-MIMO. This higher spatial granularity enables the transmitter to select a downlink precoder that focuses the transmitted energy at the target device and attempts to limit interference with other devices simultaneously scheduled on the same time and frequency resources. However, the higher spatial granularity for the PMI feedback in the Type II CSI comes with a large processing and signaling overhead. In other words, a base station may generate spatial domain (SD) and frequency domain (FD) precoded CSI-RS using a Type II precoder on a subband for joint SD and FD port emulation. However, a large overhead is needed for port specific SD and FD precoding.

Techniques described herein reduce the processing and signaling overhead for PMI feedback in Type II CSI. A UE configured according to the various aspects and techniques described herein may reduce CSI-RS overhead by receiving a CSI report configuration message from a serving base station that includes configuration of multiple CSI-RS port groups. Each of the configured port groups includes one or more CSI-RS ports, and each of the configured port groups is associated with one or more codebook subset restrictions (CBSR). Using the configured restrictions of the CBSR, the UE may determine one or more linear combination coefficients based on channel measurements of selected ones of the configured CSI-RS port groups. The UE may then signal a CSI report that includes the linear combination coefficient feedback.

A base station configured according to the various aspects and techniques described herein may reduce CSI-RS overhead by generating a CSI report configuration including configuration of multiple CSI-RS port groups, wherein each group includes one or more CSI-RS ports, and each group is associated with one or more CBSRs. The base station may receive CSI reports from its served UEs that include linear combination coefficients based on channel measurements of selected ones of the configured CSI-RS port groups. The UEs would determine such linear combination coefficient feedback according to the CBSR(s) associated with the measured CSI-RS port groups. Once the base station receives the feedback from one or more of its served UEs, it may then determine a hybrid CSI-RS codebook using both the configured CSI-RS port groups, which provides for CSI-RS port selection, and the linear combination coefficients, which refine the beam and path selections for the precoding matrices. Once the base station generates the hybrid CSI-RS codebook, it may then transmit downlink data encoded with a precoding matrix selected from the codebook.

The described techniques may reduce overhead at the UE and the base station for PMI processing, reduce bit error rates, improve efficiencies, improve coding rates, decrease system latency, and improve user experience. The described techniques may improve CSI-RS overhead.

Aspects of the disclosure are initially described in the context of wireless communications systems. Aspects of the disclosure are further illustrated by and described with reference to a swim diagram and several block diagrams. Aspects of the disclosure are further illustrated by and described with reference to apparatus diagrams, system diagrams, and flowcharts that relate to port selection codebook enhancements for spatial and FDD reciprocity.

Figure 1:
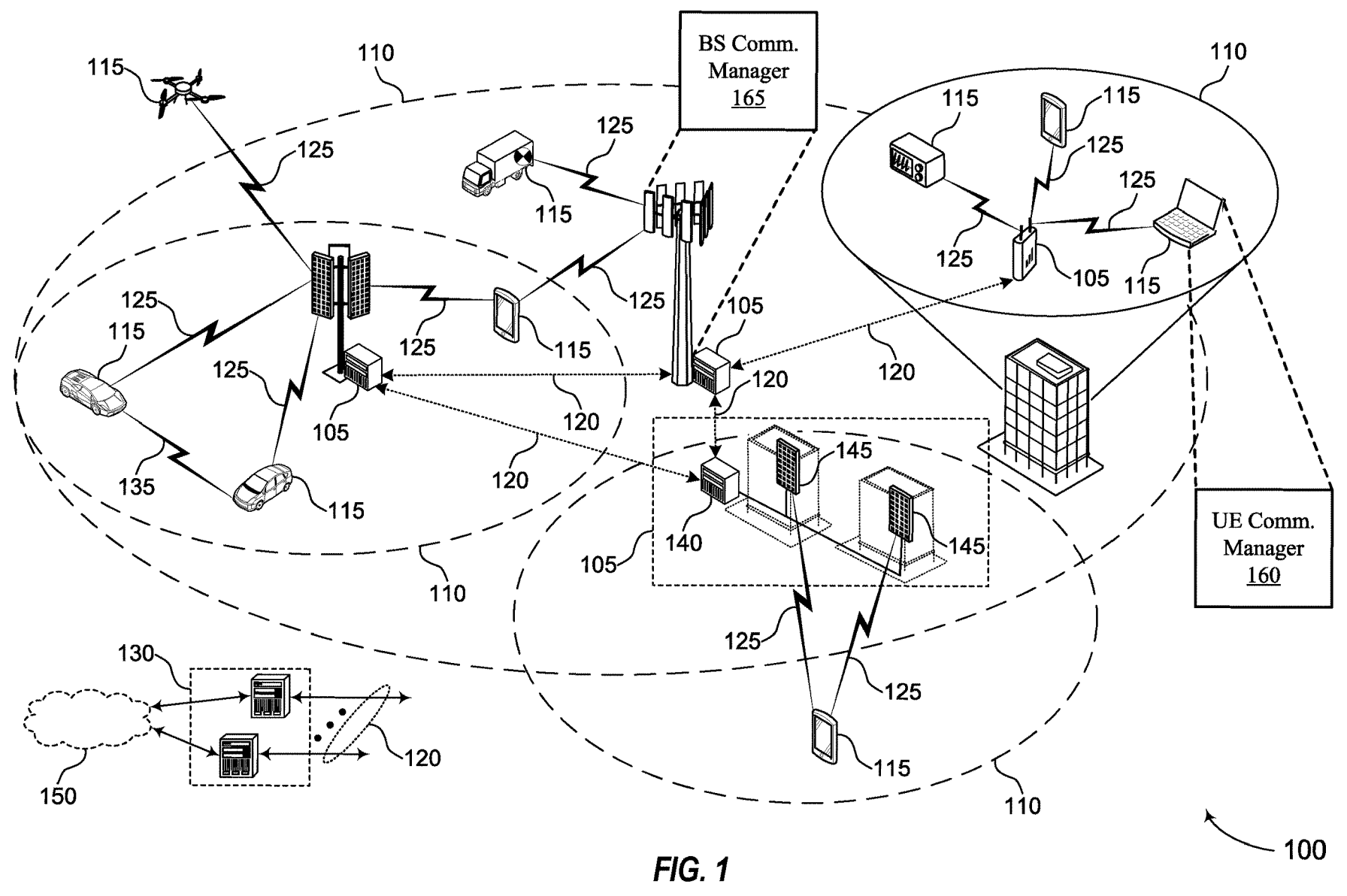

FIG. 1 illustrates an example of a wireless communications system 100 that supports port selection codebook enhancements for spatial and FDD reciprocity in accordance with aspects of the present disclosure. Wireless communications system 100 may include one or more base stations 105, one or more UEs 115, and a core network 130. In some examples, wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

Base stations 105 may be dispersed throughout a geographic area to form wireless communications system 100 and may be devices in different forms or having different capabilities. Base stations 105 and UEs 115 may wirelessly communicate via one or more communication links 125. Each base station 105 may provide a coverage area 110 over which UEs 115 and base station 105 may establish one or more communication links 125. The coverage area 110 may be an example of a geographic area over which base station 105 and UE 115 may support the communication of signals according to one or more radio access technologies.

UEs 115 may be dispersed throughout coverage area 110 of wireless communications system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

Base stations 105 may communicate with core network 130, or with one another, or both. For example, base stations 105 may interface with the core network 130 through one or more backhaul links 120 (e.g., via an S1, N2, N3, or other interface). The base stations 105 may communicate with one another over backhaul links 120 (e.g., via an X2, Xn, or other interface) either directly (e.g., directly between base stations 105), or indirectly (e.g., via core network 130), or both. In some examples, backhaul links 120 may be or include one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

UE 115 may include or may be referred to as a mobile device, a wireless device, a remote device, a handheld device, or a subscriber device, or some other suitable terminology, where the "device" may also be referred to as a unit, a station, a terminal, or a client, among other examples. UE 115 may also include or may be referred to as a personal electronic device such as a cellular phone, a personal digital assistant (PDA), a tablet computer, a laptop computer, or a personal computer. In some examples, UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

UEs 115 described herein may be able to communicate with various types of devices, such as other UEs 115 that may sometimes act as relays as well as base stations 105 and the network equipment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting communication links 125. For example, a carrier used for communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communications system 100 may support communication with UE 115 using carrier aggregation or multi-carrier operation. UE 115 may be configured with multiple downlink component carriers and one or more uplink component carriers according to a carrier aggregation configuration. Carrier aggregation may be used with both frequency division duplexing and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communications system 100 may include uplink transmissions from UE 115 to base station 105, or downlink transmissions from base station 105 to UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of wireless communications system 100 (e.g., base stations 105, UEs 115, or both) may have hardware configurations that support communications over a particular carrier bandwidth or may be configurable to support communications over one of a set of carrier bandwidths. In some examples, wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that UE 115 receives and the higher the order of the modulation scheme, the higher the data rate may be for UE 115. A wireless communications resource may refer to a combination of a radio frequency spectrum resource, a time resource, and a spatial resource (e.g., spatial layers or beams), and the use of multiple spatial layers may further increase the data rate or data integrity for communications with UE 115.

One or more numerologies for a carrier may be supported, where a numerology may include a subcarrier spacing ($\Delta f$) and a cyclic prefix. A carrier may be divided into one or more BWPs having the same or different numerologies. In some examples, UE 115 may be configured with multiple BWPs. In some examples, a single BWP for a carrier may be active at a given time and communications for UE 115 may be restricted to one or more active BWPs.

The time intervals for base stations 105 or UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of wireless communications system 100 and may be referred to as a transmission time interval (TTI). In some examples, the TTI duration (e.g., the number of symbol periods in a TTI) may be variable. Additionally or alternatively, the smallest scheduling unit of wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE, such as UE 115.

In some examples, base station 105 may be movable and therefore provide communication coverage for a moving geographic area, such as geographic coverage area 110. In some examples, different geographic coverage areas 110 associated with different technologies may overlap, but a different geographic coverage areas 110 may be supported by the same base station 105. In other examples, the overlapping geographic coverage areas 110 associated with different technologies may be supported by different base stations 105. Wireless communications system 100 may include, for example, a heterogeneous network in which different types of base stations 105 provide coverage for various geographic coverage areas 110 using the same or different radio access technologies.

Wireless communications system 100 may support synchronous or asynchronous operation. For synchronous operation, base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Wireless communications system 100 may be configured to support ultra-reliable communications or low-latency communications, or various combinations thereof. For example, wireless communications system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, UE 115 may also be able to communicate directly with other UEs 115 over a device-to-device (D2D) communication link 135 (e.g., using a peer-to-peer (P2P) or D2D protocol). One or more UEs 115 utilizing D2D communications may be within geographic coverage area 110 of base station 105. Other UEs 115 in such a group may be outside geographic coverage area 110 of base station 105 or be otherwise unable to receive transmissions from base station 105. In some examples, groups of UEs 115 communicating via D2D communications may utilize a one-to-many (1:M) system in which each UE 115 transmits to every other UE 115 in the group. In some examples, base station 105 facilitates the scheduling of resources for D2D communications. In other cases, D2D communications are carried out between UEs 115 without the involvement of base station 105.

Core network 130 may provide user authentication, access authorization, tracking, Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 served by base stations 105 associated with core network 130. User IP packets may be transferred through the user plane entity, which may provide IP address allocation as well as other functions. The user plane entity may be connected to network operators IP services 150. Network operators IP services 150 may include access to the Internet, Intranet(s), an IP Multimedia Subsystem (IMS), or a Packet-Switched Streaming Service.

Some of the network devices, such as base station 105, may include subcomponents such as access network entity 140, which may be an example of an access node controller (ANC). Each access network entity 140 may communicate with UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

Wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

Base station 105 or UE 115 may be equipped with multiple antennas, which may be used to employ techniques such as transmit diversity, receive diversity, multiple-input multiple-output (MIMO) communications, or beamforming. The antennas of base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with base station 105 may be located in diverse geographic locations. Base station 105 may have an antenna array with a number of rows and columns of antenna ports that base station 105 may use to support beamforming of communications with UE 115. Likewise, UE 115 may have one or more antenna arrays that may support various MIMO or beamforming operations. Additionally or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., base station 105, UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Base station 105 or UE 115 may use beam sweeping techniques as part of beam forming operations. For example, base station 105 may use multiple antennas or antenna arrays (e.g., antenna panels) to conduct beamforming operations for directional communications with UE 115. Some signals (e.g., synchronization signals, reference signals, beam selection signals, or other control signals) may be transmitted by base station 105 multiple times in different directions. For example, base station 105 may transmit a signal according to different beamforming weight sets associated with different directions of transmission. Transmissions in different beam directions may be used to identify (e.g., by a transmitting device, such as base station 105, or by a receiving device, such as UE 115) a beam direction for later transmission or reception by base station 105.

Some signals, such as data signals associated with a particular receiving device, may be transmitted by base station 105 in a single beam direction (e.g., a direction associated with the receiving device, such as UE 115). In some examples, the beam direction associated with transmissions along a single beam direction may be determined based on a signal that was transmitted in one or more beam directions. For example, UE 115 may receive one or more of the signals transmitted by base station 105 in different directions and may report to base station 105 an indication of the signal that UE 115 received with a highest signal quality or an otherwise acceptable signal quality.

In some examples, transmissions by a device (e.g., by base station 105 or UE 115) may be performed using multiple beam directions, and the device may use a combination of digital precoding or radio frequency beamforming to generate a combined beam for transmission (e.g., from base station 105 to UE 115). UE 115 may report feedback that indicates precoding weights for one or more beam directions, and the feedback may correspond to a configured number of beams across a system bandwidth or one or more sub-bands. Base station 105 may transmit a reference signal (e.g., a cell-specific reference signal (CRS), a CSI-RS, which may be precoded or not precoded. UE 115 may provide feedback for beam selection, which may be a PMI or codebook-based feedback (e.g., a multi-panel type codebook, a linear combination type codebook, a port selection type codebook). Although these techniques are described with reference to signals transmitted in one or more directions by base station 105, UE 115 may employ similar techniques for transmitting signals multiple times in different directions (e.g., for identifying a beam direction for subsequent transmission or reception by UE 115) or for transmitting a signal in a single direction (e.g., for transmitting data to a receiving device).

In FIG. 1, base station 105 may include a base station communications manager 165. Base station communications manager 165 may perform techniques described herein related to port selection codebook enhancements for spatial and FDD reciprocity. Base station communications manager 165 may also send a configuration signal to the UE that indicates A UE 115 may also include a UE communications manager 160. The UE communications manager 160 may perform techniques described herein related to port selection codebook enhancements for spatial and FDD reciprocity.

In some examples, UE communications manager 160 may generate a channel state information (CSI) report using the one or more CSI-RS ports based at least in part on the CSI-RS measurements. UE communications manager 160 may transmit the CSI report to base station 105.

The described techniques may reduce overhead at UE 115 and base station 105, reduce bit error rates, improve efficiencies, improve coding rates, decrease system latency, and improve user experience. The described techniques may improve CSI-RS overhead.

FIG. 2 shows a block diagram conceptually illustrating an example design of a base station 105 and a UE 115, which may be any of the base stations and one of the UEs in FIG. 1 that are capable of port selection codebook enhancements for spatial and FDD reciprocity according to the aspects of the present disclosure. For a restricted association scenario (as mentioned above), base station 105 may be a small cell base station, and UE 115 may be operating in a service area of the small cell base station, which would be included in a list of accessible UEs for the small cell base station. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, the antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the physical uplink shared channel (PUSCH)) from data source 262 and control information (e.g., for the physical uplink control channel (PUCCH)) from controller/processor 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 280 and/or other processors and modules at UE 115 may perform or direct the execution of various processes for the techniques described herein, such as to perform or direct the execution illustrated in FIGS. 5A and 5B, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Figure 3:
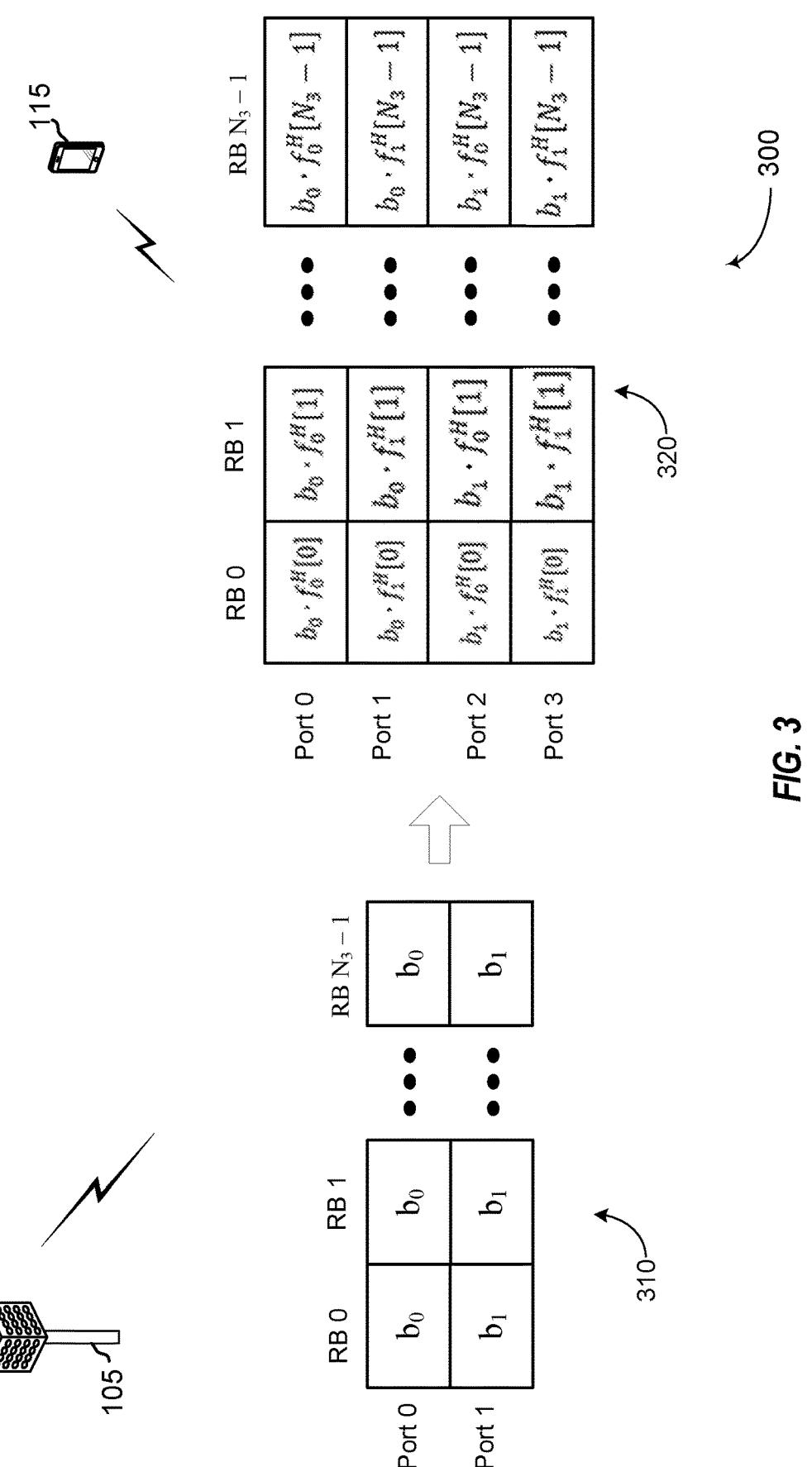
FIG. 3 is a block diagram illustrating communications between a base station and UE configured to support port selection codebook enhancements for spatial and FDD reciprocity in accordance with aspects of the present disclosure.

FIG. 3 is a block diagram 300 illustrating communications between base station 105 and UE 115 configured to support port selection codebook enhancements for spatial and FDD reciprocity in accordance with aspects of the present disclosure. In some examples, wireless communications system 100 may implement aspects of block diagram 300.

Block diagram 300 illustrates a spatial domain and frequency domain precoded CSI-RS. A base station, such as base station 105, may precode CSI-RS for transmitting it to UE 115 for channel sounding. Base station 105 may use a precoder matrix to precode the CSI-RS. The precoder may be a type I or a type II precoder, or another type of precoder. A type II precoder may be used with a type II-based codebook. For example, for a particular subband, the precoder can be formulated such that base station 105 precodes beams with feedback of the linear combination coefficients (e.g., $c_{i,m}$) on the frequency domain basis. In some examples, the spatial line frequency domain coefficients are precoded at base station 105. As a result, UE 115 may feedback the linear combination coefficients. UE 115 may save overhead computing the coefficients.

An example type II precoder is provided in Equation 1:

$$\sum_{i=0}^{2L-1} \sum_{m=0}^{M-1} b_i \cdot c_{i,m} \cdot f_m^H[n] \tag{1}$$

The term $b_i$ is defined as a spatial domain basis vector (e.g., the $i^{th}$ column of the precoder matrix $W_1$). The term $$f_m^H[n]$$

is the frequency domain basis (e.g., the element at the $m^{th}$ row, $n^{th}$ column of $$W_m^H)$$

and the term $c_{i,m}$ defines the linear combination coefficients. In Equation 1, $b_i$ corresponds to what the base station precodes and $$c_{i,m} \cdot f_m^H[n]$$

corresponds to UE feedback.

Another example of a type II precoder is provided in Equation 2:

$$\sum_{i=0}^{2L-1} \sum_{m=0}^{M-1} b_i \cdot f_m^H[n] \cdot c_{i,m} \tag{2}$$

In Equation 2, $$b_i \cdot f_m^H[n]$$

corresponds to what the base station precodes and $c_{i,m}$ corresponds to UE feedback.

FIG. 3 further illustrates a first set of resource blocks (e.g., RB0, RB1, . . . RB $N_3$–1) per CSI-RS ports (e.g., Port 0, Port 1) at 310 that are precoded following Equation 1. A second set of resource blocks (e.g., RB0, RB1, . . . RB $N_3$–1) per CSI-RS ports (e.g., Port 0, Port 1, Port 2, and Port 3) at 320 that are precoded following Equation 2. The additional precoding at the base station saves overhead at the UE.

Figure 4:
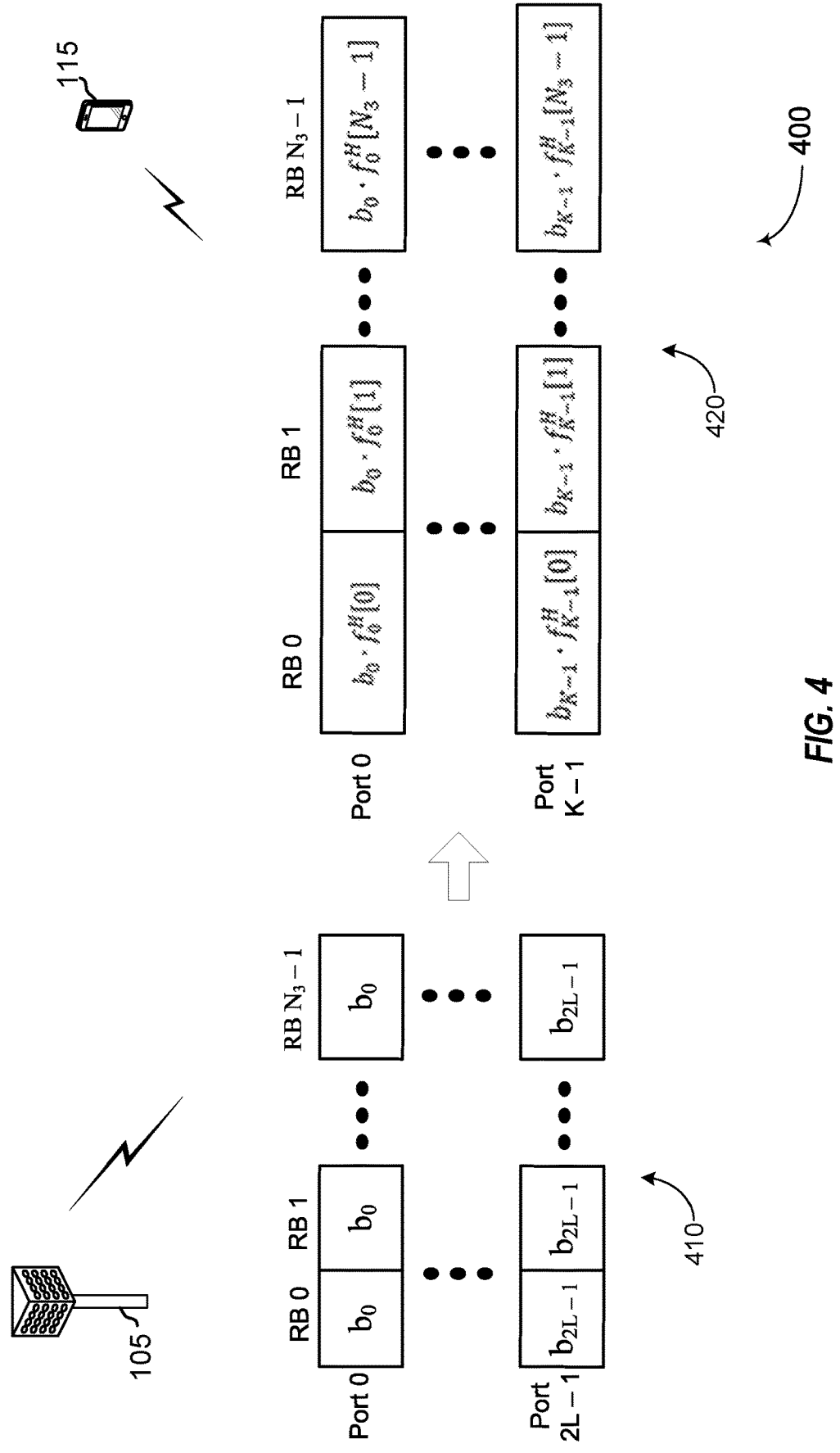
FIG. 4 is a block diagram illustrating communications between a base station and UE configured to support port selection codebook enhancements for spatial and FDD reciprocity in accordance with aspects of the present disclosure.

FIG. 4 is a block diagram 400 illustrating communications between base station 105 and UE 115 configured to support port selection codebook enhancements for spatial and FDD reciprocity in accordance with aspects of the present disclosure. Block diagram 400 illustrates the flexible port emulation that may occur at base station 105 according to joint spatial domain and frequency domain port emulation. According to Equation 1, at 410, base station 105 may emulate ports with the number of spatial linear beams constrained by a maximum of 2L beam, where L represents the total number of layers configured for transmission. The number of frequency domain basis hypotheses may further be constrained by a maximum of M bases, wherein M represents the number of actual selected frequency domain basis hypotheses. At 420, under Equation 2, base station 105 and UE 115 are constrained to a predetermined maximum linear combinations of $K_0$ ports, where $K_0$ is predetermined and configured by the network.

When the characterization of the channel reciprocity is low, allowing the spatial and frequency domain precoder to fully rely upon this reciprocity may result in poor communication quality. The various aspects of the present disclosure are directed to a hybrid of Type-II codebook structure with enhanced port selection capability. In order to implement this hybrid Type-II codebook, the CSI report configuration may impose restricted frequency domain basis selection for UE feedback. Such combination of enhanced port selection subject to codebook subset restrictions (CBSR) may improve the robustness of the CSI reporting system.

Figure 8:
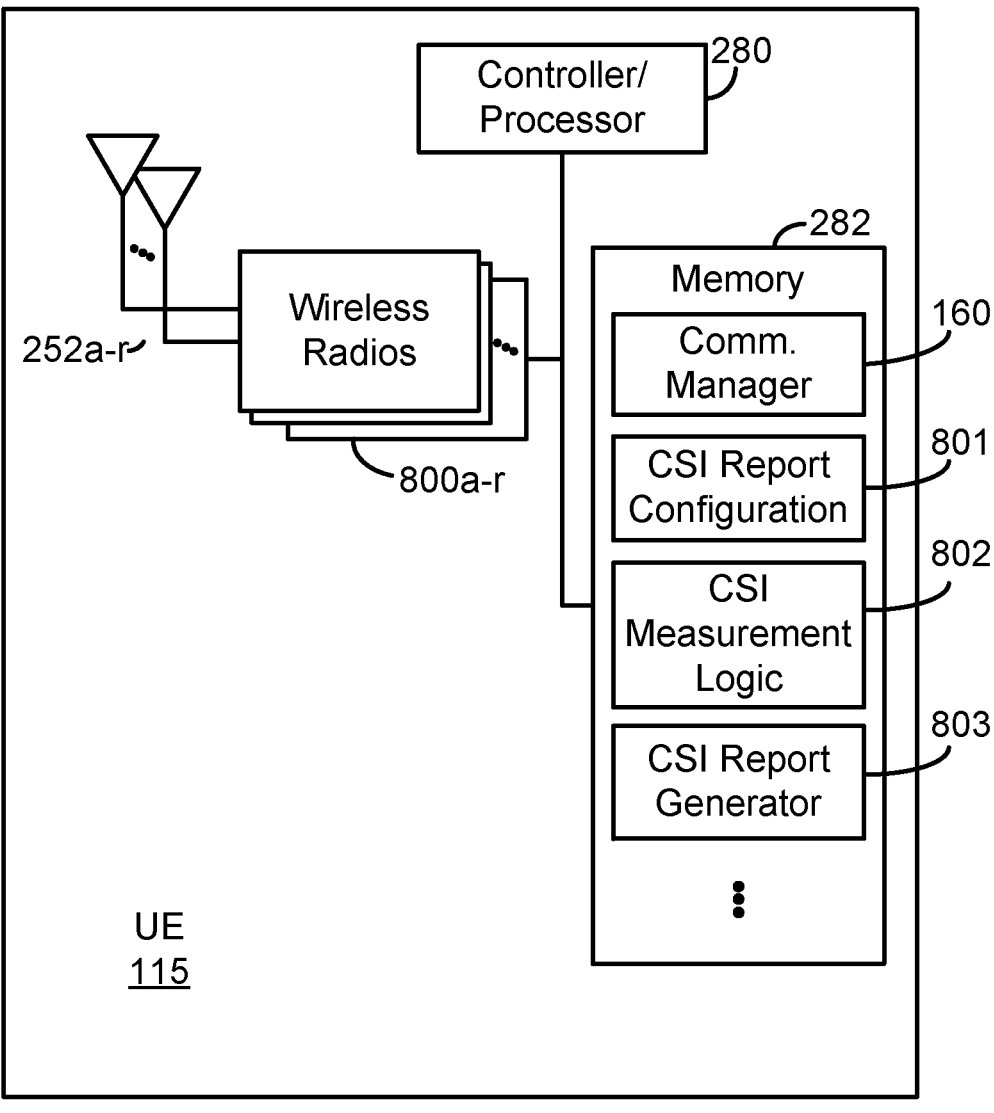
FIG. 8 is a block diagram conceptually illustrating a design of a UE configured to support port selection codebook enhancements for spatial and FDD reciprocity according to some embodiments of the present disclosure.

FIG. 5A is a block diagram illustrating example blocks executed by an example configuration of a UE to implement one aspect of the present disclosure. The example blocks will also be described with respect to UE 115 as illustrated in FIG. 8. FIG. 8 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 800*a-r* and antennas 252*a-r*. Wireless radios 800*a-r* includes various components and hardware, as illustrated in FIG. 2 for UE 115, including modulator/demodulators 254*a-r*, MIMO detector 256, receive processor 258, transmit processor 264, and TX MIMO processor 266.

At block 500, a UE receives a CSI report configuration from a serving base station, wherein the CSI report configuration includes configuration of a plurality of CSI-RS port groups, each CSI-RS port group of the plurality of CSI-RS port groups including one or more CSI-RS ports, and wherein each CSI-RS port group is associated with one or more CBSRs. The communication operations of a UE, such as UE 115, maybe controlled by execution of the logic of communication manager 160 stored in memory 282 by controller/processor 280. The functionalities and capabilities provided in execution of the logic of communication manager 160 (referred to herein as the "execution environment" of communication manager 160) allows UE 115 to control the CSI reporting operations. Within the execution environment of communication manager 160, UE 115, recognizes a CSI report configuration message received from a serving base station via antennas 252*a-r* and wireless radios 800*a-r*, and stores the configuration information, which includes the configuration of the multiple CSI-RS port groups and associated CBSRs, in memory 282 at CSI report configuration 801.

At block 501, the UE determines one or more linear combination coefficients based on channel measurements of one or more CSI-RS port groups of the plurality of CSI-RS port groups, wherein the one or more linear combination coefficients are determined according to the one or more CBSR associated with the one or more CSI-RS port groups. Within the execution environment of communication manager 160, UE 115, under control of controller/processor 280, executes CSI measurement logic 802, stored in memory 282, to implement the CSI reporting process. Within the execution environment of CSI measurement logic 802, UE 115 measures the channel characteristics of the different CSI-RS port groups of the configured port groups to derive the linear combination coefficients for feeding back to the serving base station. UE 115 performs such measurements and derives the linear combination coefficients according to the restrictions defined within the associated CBSRs from the CSI report configuration message.

At block 502, the UE reports a CSI report to the serving base station, wherein the CSI report includes the one or more linear combination coefficients. Once UE 115 compiles the linear combination coefficient feedback, the functionality within the execution environment of communication manager 160 prompts UE 115, under control of controller/processor 280, to execute CSI report generator 803, in memory 282. Within the execution environment of CSI report generator 803, UE 115 generates the CSI report that includes the linear combination coefficient feedback and transmits the CSI report to the serving base station via wireless radios 800a-r and antennas 252a-r.

Figure 9:
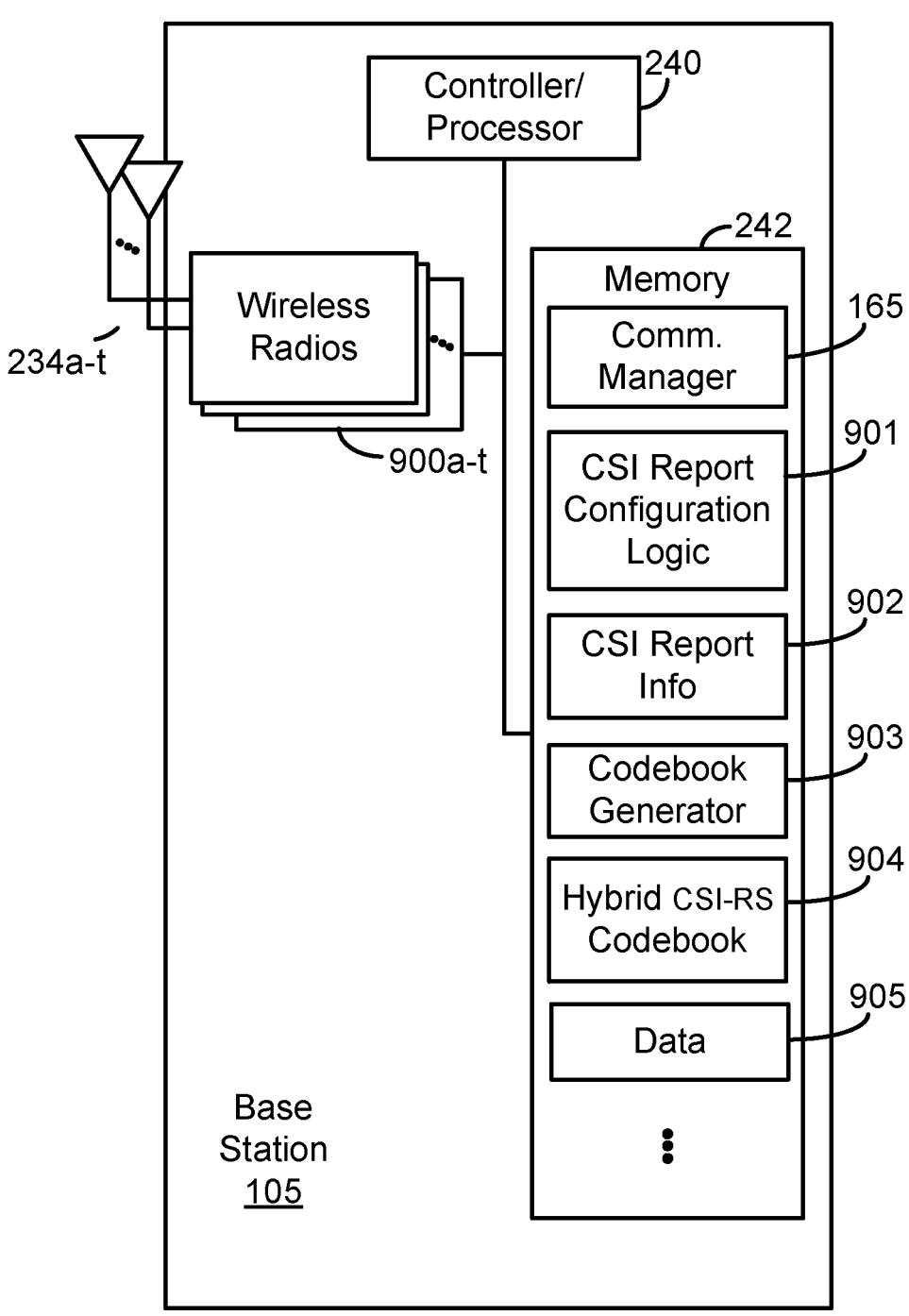
FIG. 9 is a block diagram conceptually illustrating a design of a base station configured to support port selection codebook enhancements for spatial and FDD reciprocity according to some embodiments of the present disclosure.

FIG. 5B is a block diagram illustrating example blocks executed by an example configuration of a base station to implement one aspect of the present disclosure. The example blocks will also be described with respect to base station 105 as illustrated in FIG. 9. FIG. 9 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 900a-t and antennas 234a-t. Wireless radios 900a-t includes various components and hardware, as illustrated in FIG. 2 for base station 105, including modulator/demodulators 232a-t, MIMO detector 236, receive processor 238, transmit processor 220, and TX MIMO processor 230.

At block 510, a base station generates a CSI report configuration for one or more served UEs, wherein the CSI report configuration includes configuration of a plurality of CSI-RS port groups, each CSI-RS port group of the plurality of CSI-RS port groups including one or more CSI-RS ports, and wherein each CSI-RS port group is associated with one or more CBSRs. The communication operations of a base station, such as base station 105, maybe controlled by execution of the logic of communication manager 165 stored in memory 242 by controller/processor 240. The execution environment of communication manager 165 provides the functionalities and capabilities that allow base station 105 to control the CSI reporting operations for its served UEs. Within the execution environment of communication manager 165, base station 105, under control of controller/processor 240, execute CSI report configuration logic 901, stored in memory 242. The execution environment of CSI report configuration logic 901 allows base station 105 to generate a CSI report configuration message that includes the configuration of the multiple CSI-RS port groups and associated CBSRs. Base station 105 may then transmit the CSI report configuration message to the served UEs via wireless radios 900a-t and antennas 234a-t.

At block 511, the base station receives a CSI report including one or more linear combination coefficients from the one or more served UEs based on channel measurements of one or more CSI-RS port groups of the plurality of CSI-RS port groups determined according to the one or more CBSR associated with the one or more CSI-RS port groups. Within the execution environment of communication manager 165, base station 105 recognizes a CSI report received from one or more served UEs via antennas 234a-t and wireless radios 900a-t. Base station 105 receives and decodes the linear combination coefficient feedback and stores that information in memory 242 at CSI report information 902.

At block 512, the base station determines a hybrid CSI-RS codebook using the plurality of CSI-RS port groups and the one or more linear combination coefficients. After receiving the CSI feedback, base station 105, within the execution environment of communication manager 165, base station 105 executes, under control of controller/processor 240, codebook generator 903, stored in memory 242. Codebood generator 903 uses the CSI feedback at CSI report information 902 to generate the hybrid Type II CSI-RS codebook, which is then stored in memory 242 at hybrid CSI-RS codebook 904.

At block 513, the base station transmits downlink data encoded with a precoding matrix selected from the hybrid CSI-RS codebook. Within the execution environment of communication manager 165, base station 105 detects downlink data within the downlink buffer in memory 242 and data 905. In preparing the downlink data for transmission, base station 105, within the execution environment of communication manager 165 encodes the downlink data using one of the precoding matrices of the hybrid Type II CSI-RS code book within hybrid CSI-RS codebook 904, in memory 242. Base station 105 may then transmit the encoded data to the served UE via wireless radios 900a-t and antennas 234a-t.

The 3GPP Release 16 (Rel-16) Type-II codebook structure, and beamformed (e)Type-II codebook can be described according to Equation 3, as follows:

$$W = W_1 \times \tilde{w} \times W_F^H \qquad (3)$$

$W_1$ generally includes a spatial domain precoding matrix often including a discrete Fourier transform (DFT) matrix. $W_1$ is generally a X×2L-size matrix with at most one '1' on each column, where X is the number of CSI-RS ports, and at most 2L ports are selected.

$$W_F^H$$

is frequency domain basis, which can be, for example, a DFT matrix. In an (e)Type-II codebook, M refers to the number of down selected basis selected out of total a total of $N_3$ possible DFT basis hypotheses. $\tilde{w}$ is a b×M-size kernel matrix which contains any coefficient feedback, where b represents the number of selected CSI-RS ports of the CSI-RS port group. In the (e)Type-II codebook, a maximum of $K_0$ coefficients may be selected for output of the 2LM grid and $2K_0$ coefficients may be selected across all layers.

According to the aspects of the present disclosure, the configuration of the $W_1$, $\tilde{w}$, $$W_F^H,$$

may be modified into a hybrid Type-II codebook structure. For example, according to the present aspects, $W_1$ may contain the port selection from precoded CSI-RS ports, where $W_1$ remains a X×2L size matrix with at most one '1' on each column, X is the number of CSI-RS ports, where at most 2L ports are selected. In creating the hybrid Type-II codebook structure, one consideration is that frequency domain precoding can shift the dominant delay tap to the direct current (DC) tone of the transmission, which means that the first frequency domain basis is very likely to be selected, if the reciprocity of the channel is good. Additionally, UE feedback may be used for addressing the weaker delay taps or the low reciprocal taps.

Figure 6:
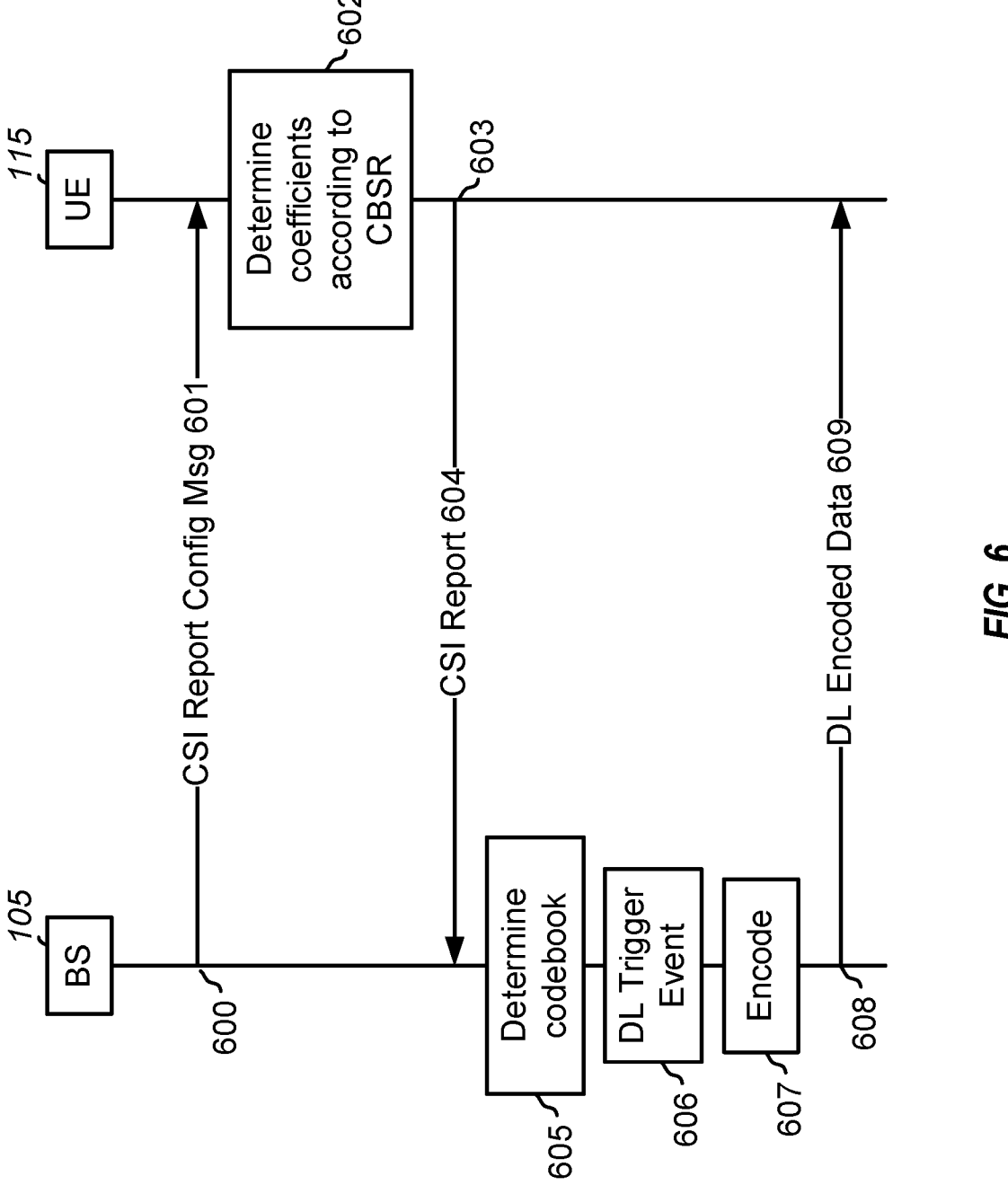
FIG. 6 is a call flow diagram illustrating communications between a base station and UE configured to support port selection codebook enhancements for spatial and FDD reciprocity in accordance with aspects of the present disclosure.

FIG. 6 is a call flow diagram illustrating communications between base station 105 and UE 115 configured to support port selection codebook enhancements for spatial and FDD reciprocity in accordance with aspects of the present disclosure. At 600, base station 105 transmits CSI report configuration message 601 to UE 115. CSI report configuration message 601 includes a variety of CSR reporting parameters and information, such as configuration of multiple CSI-RS port groups each including port selection parameters for identifying one or more CSI-RS ports from the configured CSI-RS port groups and one or more codebook subset restrictions (CBSRs) associated with each CSI-RS port or CSI-RS port group. For example, when configured in two groups, group-0 may be restricted for wideband linear combination coefficients and group-1 may be restricted for subband frequency domain basis linear combination coefficients.

UE 115 uses the CSI reporting information to identify the CSI-RS ports within each port group for CSI reporting, as well as the various CBSR restrictions to apply in the channel measurements for developing the linear combination coefficient feedback for base station 105 at 602. UE 115 creates CSI report 604 using the linear combination coefficient feedback determined using the CSI reporting information and CBSR restrictions from CSI report configuration message 601. At 603, UE 115 may transmit CSI report 604 to base station 105.

Once base station 105 receives the linear combination coefficient feedback in CSI report 604, it may form the hybrid Type II codebook using the port selection parameters that were provided to UE 115 in CSI report configuration message 601 and the linear combination coefficient feedback received from UE 115 in CSI report 604. With these two parameters, base station 105 may calculate the hybrid Type II codebook at 605. Once a downlink trigger event is detected at 606, base station 105 may prepare the downlink data for transmission by encoding the downlink data at 607 using one of the precoders or precoding matrices of the hybrid Type II codebook. At 608, base station 105 transmits encoded downlink data 609 to UE 115.

According to various aspects of the present disclosure, base station 105 may configure multiple groups of CSI-RS ports. In the illustrated example, base station 105 configures two CSI-RS port groups. The first group, group-0, may contain p CSI-RS ports that support wideband linear combination coefficients (M=1), while the other group, group-1, may contain q CSI-RS ports that support multiple frequency domain basis linear combination coefficients (M>1) for more of a subband coverage. As illustrated at 600, base station 105 may send CSI report configuration message 601 that includes the configuration of the multiple CSI-RS port groups. As a part of the CSI report configuration, base station 105 may also communicate a parameter that allows the UEs, such as UE 115, to identify the number of ports included in each of the configured groups. Where two CSI-RS port groups have been configured, as illustrated in FIG. 6, for example, the two sets of CSI-RS port groups may cover one CSI-RS resource with N ports. Using the port parameter in the configuration, UE 115 may determine the number of ports in each group where the combination of the number of ports in group-0,p, and the number of ports in group-1, q, is limited by the total number of ports, N, of the CSI-RS resource, p+q=N. For example, this port parameter, $\alpha$, may be used by UE 115 to determine the first set of CSI-RS ports, with $p=\lfloor \alpha N \rfloor$, and the second set of CSI-RS ports, with $q=N-p$. It should be noted that in aspects where the different sets of CSI-RS ports in the port groups cover different CSI-RS resources, each such set of CSI-RS port groups would have p and q ports per CSI-RS resource.

The hybrid Type-II codebook structure according to the various aspects of the present disclosure includes a hybrid frequency domain basis with multiple CSI-RS port groups may be defined by Equation 4, as follows:

$$W = \begin{bmatrix} W_1^{(0)} & \\ & W_1^{(1)} \end{bmatrix} \times \begin{bmatrix} \tilde{w}^{(0)} W_F^{H^{(0)}} \\ \tilde{w}^{(1)} W_F^{H^{(1)}} \end{bmatrix} \tag{4}$$

$$W_1^{(0)} \text{ and } W_1^{(1)}$$

according to the hybrid Type-II codebook structure provide a port selection matrix for group-0 and group-1 CSI-RS ports, respectively.

$$\tilde{w}^{(0)} W_F^{H^{(0)}}$$

represents the wideband linear combination coefficient feedback for group-0 CSI-RS ports, where $$W_F^{H^{(1)}}$$

may include a 1×$N_3$ row vector of all '1s' (e.g., the first DFT vector).

$$\tilde{w}^{(1)} W_F^{H^{(1)}}$$

represents the frequency domain linear combined coefficient feedback for the subband frequency domain unit, where the $$W_F^{H^{(1)}}$$

is an M×$N_3$ matrix where frequency domain basis selection may be used.

Figure 7:
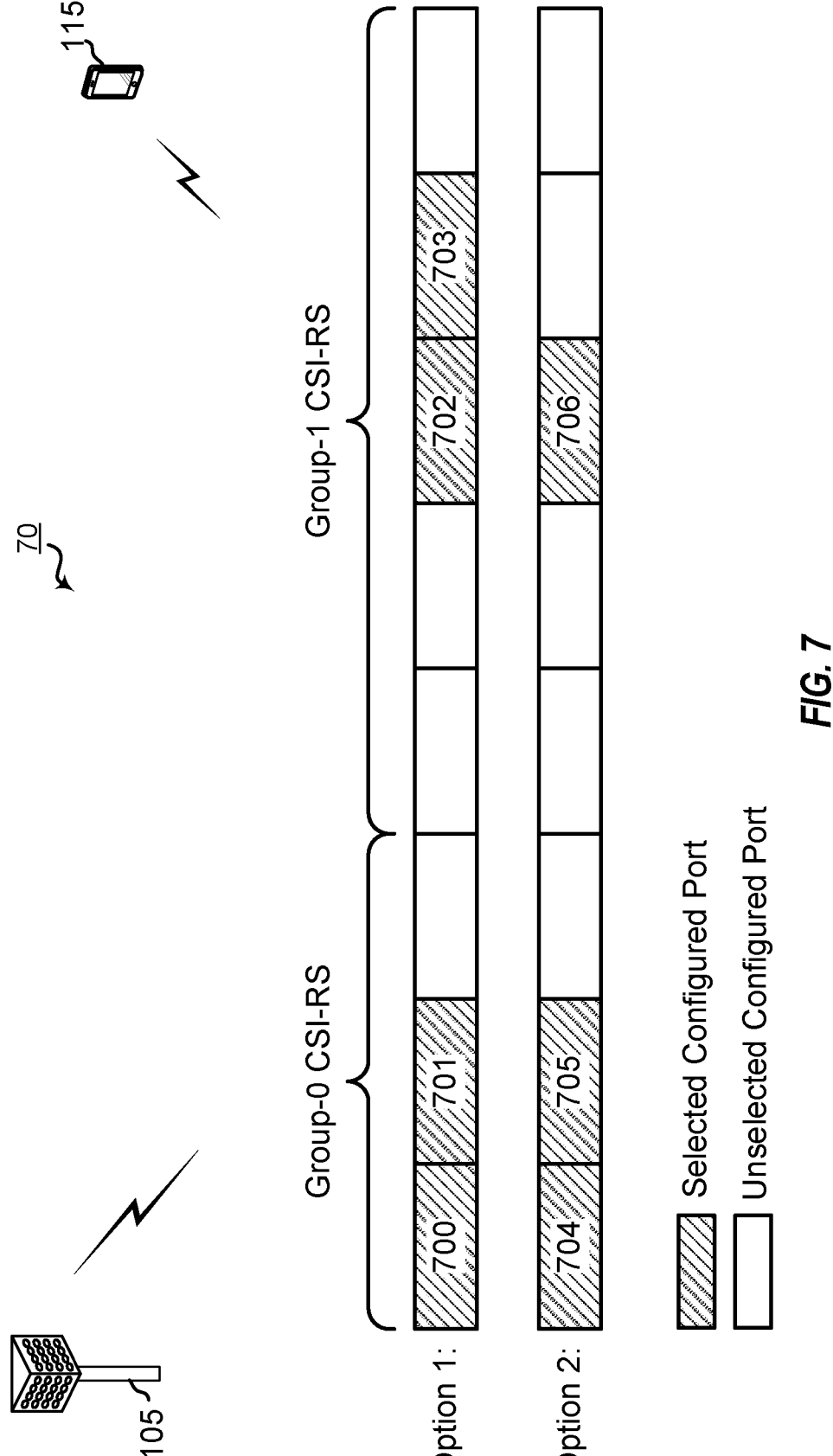
FIG. 7 is a block diagram illustrating communications between a base station and UE configured to support port selection codebook enhancements for spatial and FDD reciprocity in accordance with aspects of the present disclosure.

FIG. 7 is a block diagram illustrating communications between base station 105 and UE 115 configured to support port selection codebook enhancements for spatial and FDD reciprocity in accordance with aspects of the present disclosure. As illustrated in FIG. 7, in the codebook configuration, base station 105 may include the port selection information within the CSI report configuration message (e.g., CSI report configuration message 601 of FIG. 6). In a first optional implementation, the port selection information may designate a total number of selected ports over the total number of CSI-RS port groups, e.g., $\lfloor \beta X \rfloor$. In such an optional implementation, the port selection information may provide for the number of ports to be selected in $W_1$ proportionally. The transmission stream of Option 1 illustrates such first optional implementation. The port parameter communicated to UE 115 in the CSI report configuration message allows UE 115 to identify that the group-0 CSI-RS port group includes three (3) CSI-RS ports (e.g., p=3) and that the group-1 CSI-RS port group includes five (5) CSI-RS ports. The port selection information included in the CSI report configuration message allows UE 115 to calculated the total number of ports to be selected between group-1 and group-2 (e.g., ($\beta \times 8=4$)). With the port selection information indicating a total number of selected ports, UE 115 will select the four (4) total ports proportionally between group-0 and group-1. Accordingly, UE 115 selects 2 of the 3 available CSI-RS ports (ports 700 and 701) in group-0 and 2 of the 5 available CSI-RS ports (ports 702 and 703) in group-1. UE 115 will perform the CSI reporting measurements and calculations on the selected ports (ports 700-703) to determine the linear combination coefficient feedback for the CSI report.

In a second optional implementation, port selection information is provided in the CSI report configuration message to allow UE 115 to identify a number of selected CSI-RS ports for each of the group-0 and group-1 CSI-RS port. Thus, group-0 and group-1 may have different numbers of selected CSI-RS ports. The transmission stream of Option-2 illustrates this second optional implementation. Using the port selection information for each group, UE 115 determines that, at most, a ports may be selected in group-0 and, at most, b ports may be selected in group-1, where a and b are configured and may associated with p and q, such that $a=\lfloor \beta_1 p \rfloor$, $b=\lfloor \beta_2 q \rfloor$. As illustrated in FIG. 7, $\lfloor \beta_1 p \rfloor$ resolves into a=2 and $\lfloor \beta_2 q \rfloor$ resolves into b=1. Thus, UE 115 would select ports 704 and 705 (a=2) for group-0 and select ports 706 (b=1) for group-1.

The indication of port selection may be reported via bit map. For example, for an N port CSI-RS, an N-bit bitmap field may be carried in the CSI report to convey the selected CSI-RS port for linear combination. It should be noted that the port selection indicator may be reported via a combination, e.g., for the second optional implementation, $$\lceil \log_2 C_p^a + \log_2 C_p^b \rceil$$

may be used for indication of the port selection.

Additional aspects of the present disclosure may provide various CBSR, such as a CBSR mandating wideband frequency domain basis to be selected. $\tilde{w}^{(0)}$ contains all non-zero coefficients. Therefore, no coefficient selection would typically be used for $\tilde{w}^{(0)}$. In contrast, the first column of $\tilde{w}^{(1)}$ includes all non-zero coefficients, while the remaining columns of $\tilde{w}^{(1)}$ may include both zero and non-zero coefficients. Because first column of $\tilde{w}^{(1)}$ may contain all non-zero coefficients, no coefficient selection would be configured at least for the first column of $\tilde{w}^{(1)}$. Coefficient selection for $\tilde{w}^{(1)}$ may be configured for the remaining M−1 frequency domain basis hypotheses. Referring back to FIG. 7, in such case, UE 115, after obtaining the CBSR in CSI report configuration message 601 that sets the restriction for wideband frequency domain basis selection, determines the wideband and subband linear combination coefficient feedback, the wideband coefficients are formulated into the $\tilde{w}^{(0)}$ matrix and the subband coefficients are formulated into the $\tilde{w}^{(1)}$ matrix. UE 115 would also generate a coefficient bitmap for $\tilde{w}^{(1)}$, which includes b(M−1) bits that indicates for base station 105 the non-zero coefficients for $\tilde{w}^{(1)}$ in the second through $M^{th}$ columns of $\tilde{w}^{(1)}$.

In another example aspect, CSI report configuration message 601 may include a CBSR that restricts the total number of non-zero coefficients (NZCs) for feedback in $\tilde{w}^{(0)}$ and $\tilde{w}^{(1)}$ to a predetermined value, $K_0$, such that $NZC(\tilde{w}^{(0)})+NZC(\tilde{w}^{(1)})<K_0$. In a further example, for multiple layers, the non-zero coefficients of multiple layers may be within $2K_0$.

For multi-layer feedback, CSI report configuration message 601 may include a CBSR that provides for $$W_1^{(0)} \text{ and } W_1^{(1)}$$

to be applied for either to the same or different configured transmission layers. CSI report configuration message 601 may further include a CBSR that provides for a different $$W_1^{(0)} \text{ and } W_1^{(1)}$$

per layer. The feedback from UE 115 could be configured in a hierarchical fashion, such that a superset of $$W_1^{(0)} \text{ and } W_1^{(1)}$$

may be configured by base station 105 where the feedback resulting from $$W_1^{(0)} \text{ and } W_1^{(1)}$$

may be down selected within the superset.

It should be noted that CSI report configuration message 601 may include an additional CBSR that configures each port in the group-1 set of CSI-RS ports to be assigned with a frequency domain basis range restriction, such that the frequency domain basis would be selected from a subset basis index out of total available frequency domain basis hypotheses. Additionally, CSI report configuration message 601 a CBSR may confirm that the CSI-RS ports in group-1 will not share the same spatial domain precoder with the group-0 CSI-RS ports.

The various aspects and designs of the present disclosure may be broadly considered as a kind of codebook subset restriction for frequency domain basis. For example, different CSI-RS ports may be associated with different frequency domain basis restrictions configured via CBSR within the CSI report configuration message 601. Different CSI-RS port groups can also be signaled via different levels of CBSR. For example, the group-0 CSI-RS ports may be associated with a CBSR for wideband frequency domain basis, while the Group-1 CSI-RS ports may be associated with a CBSR for more frequency domain bases.

The referenced hierarchical configuration of CBSRs may be implemented where base station 105 transmits via higher-layer signaling, (e.g., RRC or MAC-CE) configurations of the multiple sets of CSI-RS CBSR configurations associated with a CSI-RS port group or individual ports within the port groups. Base station 105 would then signal a specific trigger for the CSI report with an indication of the particular CBSR to select via downlink control information (DCI) messaging to UE 115. Each CBSR may further be associated with other aspects of the communication operations, such as per different rank indicator per port, per configured layers, and the like.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and modules described herein (e.g., the components, functional blocks, and modules in FIG. 2) may comprise processors, electronics devices, hardware devices, electronics components, logical circuits, memories, software codes, firmware codes, etc., or any combination thereof. In addition, features discussed herein relating to port selection codebook enhancements for spatial and FDD reciprocity may be implemented via specialized processor circuitry, via executable instructions, and/or combinations thereof.

Those of skill would further appreciate that the various illustrative logical blocks, modules, circuits, and algorithm steps (e.g., the logical blocks in FIGS. 5A and 5B) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various aspects of the present disclosure may be implemented in many different ways, including methods, processes, non-transitory computer-readable medium having program code recorded thereon, apparatus having one or more processors with configurations and instructions for performing the described features and functionality, and the like. For example, a first example aspect configured for wireless communication may include receiving, by a UE, a CSI report configuration from a serving base station, wherein the CSI report configuration includes configuration of a plurality of CSI-RS port groups, each CSI-RS port group of the plurality of CSI-RS port groups including one or more CSI-RS ports, and wherein each CSI-RS port group is associated with one or more codebook subset restrictions (CBSR); determining, by the UE, one or more linear combination coefficients based on channel measurements of one or more CSI-RS port groups of the plurality of CSI-RS port groups, wherein the one or more linear combination coefficients are determined according to the one or more CBSR associated with the one or more CSI-RS port groups; and reporting, by the UE, a CSI report to the serving base station, wherein the CSI report includes the one or more linear combination coefficients.

A second aspect, based on the first aspect may further include determining, by the UE, the one or more CSI-RS ports within each CSI-RS port group using a CSI-RS port parameter within the CSI report configuration.

A third aspect, based on the second aspect, wherein the one or more CSI-RS ports identified by the CSI-RS port parameter are one of: a same set of the one or more CSI-RS ports for each layer supported by the each CSI-RS port group; or a different set of the one or more CSI-RS ports for the each layer.

A fourth aspect, based on the second aspect, further including: identifying, by the UE, a set of selected CSI-RS ports within the each CSI-RS port group based on a port selection identifier indicated in the CSI-report configuration, wherein the port selection identifier includes one of: a total number of selected CSI-RS ports applied proportionally by the UE to the each CSI-RS port group; or a per group selected port indicator identifying a per group number of selected CSI-RS ports per the each CSI-RS port group.

A fifth aspect, based on the first aspect, wherein the one or more CBSR include at least a CBSR for wideband frequency domain basis linear combination coefficient and a CBSR for a plurality of subband frequency domain bases linear combination coefficients.

A sixth aspect, based on the fifth aspect wherein the determining the one or more CSI-RS ports includes: determining a selected number of CSI-RS ports, b, of an identified CSI-RS port group of the one or more CSI-RS port groups, wherein the determining the one or more linear combination coefficients includes: generating a feedback matrix including a set of frequency domain bases linear combination coefficients of the one or more linear combination coefficients based on the channel measurements of the selected number of CSI-RS ports, wherein the identified CSI port group is associated with the CBSR for the plurality of subband frequency domain bases linear combination coefficients, wherein the feedback matrix includes M columns, where M represents a number of frequency domain bases selected for the set of frequency domain bases linear combination coefficients, and wherein each coefficient of the set of frequency domain bases linear combination coefficients in a first column of the feedback matrix corresponds to a non-zero coefficient and one or more additional non-zero coefficients are provided in one or more entries in a second column through an $M^{th}$ column of the feedback matrix; and generating a coefficient bit map having $b(M-1)$ bits, wherein the coefficient bit map indicates each of the one or more additional non-zero coefficients in the second column through the $M^{th}$ column of the feedback matrix, and wherein the CSI report includes the coefficient bit map.

A seventh aspect, based on the fifth aspect, wherein at least one CBSR of the CBSR for the plurality of subband frequency domain bases linear combination coefficients restricts the frequency domain basis range to a subset of frequency domain basis hypotheses less than a total number of candidate frequency domain basis hypotheses.

An eighth aspect, based on the fifth aspect, wherein each of the one or more CSI-RS ports of the each CSI-RS port group associated with the at least one CBSR for wideband frequency domain basis linear combination coefficient and each other of the one or more CSI-RS ports of the each CSI-RS port group associated with the at least one CBSR for the plurality of subband frequency domain bases linear combination coefficients use a different spatial domain precoder.

A ninth aspect, based on the first aspect, wherein each of the one or more CBSR is associated with one or more of: a rank indicator for each of the one or more CSI-RS ports; a corresponding layer supported by each of the one or more CSI-RS port groups.

A tenth aspect, based on the first aspect wherein the determining the one or more linear combination coefficients includes: receiving a DCI message from the serving base station, wherein the DCI message includes a CBSR indicator; and selecting an indicated CBSR of the one or more CBSR using the CBSR indicator, wherein the one or more linear combination coefficients are determined according to the indicated CBSR.

An eleventh aspect, based on the first aspect, wherein one of the one or more CBSR limits a total number of the one or more linear combination coefficients to a predetermined number.

A twelfth aspect may include any combination of the first through the eleventh aspects.

A thirteenth aspect configured for wireless communication includes generating, by a base station, a CSI report configuration for one or more served UEs, wherein the CSI report configuration includes configuration of a plurality of CSI-RS port groups, each CSI-RS port group of the plurality of CSI-RS port groups including one or more CSI-RS ports, and wherein each CSI-RS port group is associated with one or more CBSR; receiving, by the base station, a CSI report including one or more linear combination coefficients from the one or more served UEs based on channel measurements of one or more CSI-RS port groups of the plurality of CSI-RS port groups determined according to the one or more CBSR associated with the one or more CSI-RS port groups; determining, by the base station, a hybrid CSI-RS codebook using the plurality of CSI-RS port groups and the one or more linear combination coefficients; and transmitting, by the base station, downlink data encoded with a precoding matrix selected from the hybrid CSI-RS codebook.

A fourteenth aspect, based on the thirteenth aspect, wherein the CSI report configuration further includes: a CSI-RS port parameter configured to identify the one or more CSI-RS ports within each CSI-RS port group.

A fifteenth aspect, based on the fourteenth aspect, wherein the CSI-RS port parameter identifies the one or more CSI-RS ports as one of: a same set of the one or more CSI-RS ports for each layer supported by the each CSI-RS port group; or a different set of the one or more CSI-RS ports for the each layer.

A sixteenth aspect, based on the fourteenth aspect, wherein the CSI report configuration further includes: a port selection identifier configured to identify a set of selected CSI-RS ports of the one or more CSI-RS ports for CSI reporting, wherein the port selection identifier includes one of: a total number of selected CSI-RS ports applied proportionally to the each CSI-RS port group; or a per group selected port indicator identifying a per group number of selected CSI-RS ports per the each CSI-RS port group.

A seventeenth aspect, based on the thirteenth aspect, wherein the one or more CBSR includes at least a first CBSR for wideband frequency domain basis linear combination coefficient and at least a second CBSR for a plurality of subband frequency domain bases linear combination coefficients, wherein the one or more linear combination coefficients of the CSI report includes a first set of wideband frequency domain basis linear combination coefficients determined according to the first CBSR and a second set of subband frequency domain bases linear combination coefficients determined according to the second CBSR.

An eighteenth aspect, based on the seventeenth aspect, wherein the a second set of subband frequency domain bases linear combination coefficients is received as a feedback matrix in the CSI report having b rows and M columns, where b represents a number of ports of the one or more CSI-RS ports selected for CSI reporting and M represents a number of frequency domain bases selected for second set of subband frequency domain bases linear combination coefficients, and wherein each coefficient of the second set of subband frequency domain bases linear combination coefficients in a first column of the feedback matrix corresponds to a non-zero coefficient and one or more additional non-zero coefficients are provided in one or more entries in a second column through an $M^{th}$ column of the feedback matrix, and wherein the CSI report further includes a coefficient bit map having $b(M-1)$ bits, wherein the coefficient bit map indicates to the base station each of the one or more additional non-zero coefficients in the second column through the $M^{th}$ column of the feedback matrix.

A nineteenth aspect, based on the seventeenth aspect, wherein at least one CBSR of the second CBSR for the plurality of subband frequency domain bases linear combination coefficients restricts the frequency domain basis range to a subset of frequency domain basis hypotheses less than a total number of candidate frequency domain basis hypotheses.

A twentieth aspect, based on the seventeenth aspect, wherein each of the one or more CSI-RS ports of the each CSI-RS port group associated with the first CBSR for wideband frequency domain basis linear combination coefficient and each other of the one or more CSI-RS ports of the each CSI-RS port group associated with the second CBSR for the plurality of subband frequency domain bases linear combination coefficients use a different spatial domain precoder.

A twenty-first aspect, based on the thirteenth aspect, wherein each of the one or more CBSR is associated with one or more of: a rank indicator for each of the one or more CSI-RS ports; a corresponding layer supported by each of the one or more CSI-RS port groups.

A twenty-second aspect, based on the thirteenth aspect, further including: transmitting, by the base station, a DCI message to the one or more served UEs, wherein the DCI message includes a CBSR indicator configured to identify an indicated CBSR of the one or more CBSR according to which the one or more linear combination coefficients are determined.

A twenty-third aspect, based on the thirteenth aspect, wherein one of the one or more CBSR limits a total number of the one or more linear combination coefficients determined by each UE of the one or more served UEs to a predetermined number.

A twenty-fourth aspect may include any combination of the thirteenth through the twenty-third aspects.

A twenty-fifth aspect configured for wireless communication may include means for receiving, by a UE, a CSI report configuration from a serving base station, wherein the CSI report configuration includes configuration of a plurality of CSI-RS port groups, each CSI-RS port group of the plurality of CSI-RS port groups including one or more CSI-RS ports, and wherein each CSI-RS port group is associated with one or more CBSR; means for determining, by the UE, one or more linear combination coefficients based on channel measurements of one or more CSI-RS port groups of the plurality of CSI-RS port groups, wherein the one or more linear combination coefficients are determined according to the one or more CBSR associated with the one or more CSI-RS port groups; and means for reporting, by the UE, a CSI report to the serving base station, wherein the CSI report includes the one or more linear combination coefficients.

A twenty-sixth aspect, based on the twenty-fifth aspect, further including: means for determining, by the UE, the one or more CSI-RS ports within each CSI-RS port group using a CSI-RS port parameter within the CSI report configuration.

A twenty-seventh aspect, based on the twenty-sixth aspect, wherein the one or more CSI-RS ports identified by the CSI-RS port parameter are one of: a same set of the one or more CSI-RS ports for each layer supported by the each CSI-RS port group; or a different set of the one or more CSI-RS ports for the each layer.

A twenty-eighth aspect, based on the twenty-sixth aspect, further including: means for identifying, by the UE, a set of selected CSI-RS ports within the each CSI-RS port group based on a port selection identifier indicated in the CSI-report configuration, wherein the port selection identifier includes one of: a total number of selected CSI-RS ports applied proportionally by the UE to the each CSI-RS port group; or a per group selected port indicator identifying a per group number of selected CSI-RS ports per the each CSI-RS port group.

A twenty-ninth aspect, based on the twenty-fifth aspect, wherein the one or more CBSR include at least a CBSR for wideband frequency domain basis linear combination coefficient and a CBSR for a plurality of subband frequency domain bases linear combination coefficients.

A thirtieth aspect, based on the twenty-ninth aspect, wherein the means for determining the one or more CSI-RS ports includes: means for determining a selected number of CSI-RS ports, b, of an identified CSI-RS port group of the one or more CSI-RS port groups, wherein the means for determining the one or more linear combination coefficients includes: means for generating a feedback matrix including a set of frequency domain bases linear combination coefficients of the one or more linear combination coefficients based on the channel measurements of the selected number of CSI-RS ports, wherein the identified CSI port group is associated with the CBSR for the plurality of subband frequency domain bases linear combination coefficients, wherein the feedback matrix includes M columns, where M represents a number of frequency domain bases selected for the set of frequency domain bases linear combination coefficients, and wherein each coefficient of the set of frequency domain bases linear combination coefficients in a first column of the feedback matrix corresponds to a non-zero coefficient and one or more additional non-zero coefficients are provided in one or more entries in a second column through an $M^{th}$ column of the feedback matrix; and means for generating a coefficient bit map having $b(M-1)$ bits, wherein the coefficient bit map indicates each of the one or more additional non-zero coefficients in the second column through the $M^{th}$ column of the feedback matrix, and wherein the CSI report includes the coefficient bit map.

A thirty-first aspect, based on the twenty-ninth aspect, wherein at least one CBSR of the CBSR for the plurality of subband frequency domain bases linear combination coefficients restricts the frequency domain basis range to a subset of frequency domain basis hypotheses less than a total number of candidate frequency domain basis hypotheses.

A thirty-second aspect, based on the twenty-ninth aspect, wherein each of the one or more CSI-RS ports of the each CSI-RS port group associated with the at least one CBSR for wideband frequency domain basis linear combination coefficient and each other of the one or more CSI-RS ports of the each CSI-RS port group associated with the at least one CBSR for the plurality of subband frequency domain bases linear combination coefficients use a different spatial domain precoder.

A thirty-third aspect, based on the twenty-fifth aspect, wherein each of the one or more CBSR is associated with one or more of: a rank indicator for each of the one or more CSI-RS ports; or a corresponding layer supported by each of the one or more CSI-RS port groups.

A thirty-fourth aspect, based on the twenty-fifth aspect, wherein the means for determining the one or more linear combination coefficients includes: means for receiving a DCI message from the serving base station, wherein the DCI message includes a CBSR indicator; and means for selecting an indicated CBSR of the one or more CBSR using the CBSR indicator, wherein the one or more linear combination coefficients are determined according to the indicated CBSR.

A thirty-fifth aspect, based on the twenty-fifth aspect, wherein one of the one or more CBSR limits a total number of the one or more linear combination coefficients to a predetermined number.

A thirty-sixth aspect may include any combination of the twenty-fifth through the thirty-fifth aspects.

A thirty-seventh aspect configured for wireless communication may include means for generating, by a base station, a CSI report configuration for one or more served UEs, wherein the CSI report configuration includes configuration of a plurality of CSI-RS port groups, each CSI-RS port group of the plurality of CSI-RS port groups including one or more CSI-RS ports, and wherein each CSI-RS port group is associated with one or more CBSR; means for receiving, by the base station, a CSI report including one or more linear combination coefficients from the one or more served UEs based on channel measurements of one or more CSI-RS port groups of the plurality of CSI-RS port groups determined according to the one or more CBSR associated with the one or more CSI-RS port groups; means for determining, by the base station, a hybrid CSI-RS codebook using the plurality of CSI-RS port groups and the one or more linear combination coefficients; and means for transmitting, by the base station, downlink data encoded with a precoding matrix selected from the hybrid CSI-RS codebook.

A thirty-eighth aspect, based on the thirty-seventh aspect, wherein the CSI report configuration further includes: a CSI-RS port parameter configured to identify the one or more CSI-RS ports within each CSI-RS port group.

A thirty-ninth aspect, based on the thirty-eighth aspect, wherein the CSI-RS port parameter identifies the one or more CSI-RS ports as one of: a same set of the one or more CSI-RS ports for each layer supported by the each CSI-RS port group; or a different set of the one or more CSI-RS ports for the each layer.

A fortieth aspect, based on the thirty-eighth aspect, wherein the CSI report configuration further includes: a port selection identifier configured to identify a set of selected CSI-RS ports of the one or more CSI-RS ports for CSI reporting, wherein the port selection identifier includes one of: a total number of selected CSI-RS ports applied proportionally to the each CSI-RS port group; or a per group selected port indicator identifying a per group number of selected CSI-RS ports per the each CSI-RS port group.

A forty-first aspect, based on the thirty-seventh aspect, wherein the one or more CBSR includes at least a first CBSR for wideband frequency domain basis linear combination coefficient and at least a second CBSR for a plurality of subband frequency domain bases linear combination coefficients, wherein the one or more linear combination coefficients of the CSI report includes a first set of wideband frequency domain basis linear combination coefficients determined according to the first CBSR and a second set of subband frequency domain bases linear combination coefficients determined according to the second CBSR.

A forty-second aspect, based on the forty-first aspect, wherein the a second set of subband frequency domain bases linear combination coefficients is received as a feedback matrix in the CSI report having b rows and M columns, where b represents a number of ports of the one or more CSI-RS ports selected for CSI reporting and M represents a number of frequency domain bases selected for second set of subband frequency domain bases linear combination coefficients, and wherein each coefficient of the second set of subband frequency domain bases linear combination coefficients in a first column of the feedback matrix corresponds to a non-zero coefficient and one or more additional non-zero coefficients are provided in one or more entries in a second column through an $M^{th}$ column of the feedback matrix, and wherein the CSI report further includes a coefficient bit map having b(M−1) bits, wherein the coefficient bit map indicates to the base station each of the one or more additional non-zero coefficients in the second column through the $M^{th}$ column of the feedback matrix.

A forty-third aspect, based on the forty-first aspect, wherein at least one CBSR of the second CBSR for the plurality of subband frequency domain bases linear combination coefficients restricts the frequency domain basis range to a subset of frequency domain basis hypotheses less than a total number of candidate frequency domain basis hypotheses.

A forty-fourth aspect, based on the forty-first aspect, wherein each of the one or more CSI-RS ports of the each CSI-RS port group associated with the first CBSR for wideband frequency domain basis linear combination coefficient and each other of the one or more CSI-RS ports of the each CSI-RS port group associated with the second CBSR for the plurality of subband frequency domain bases linear combination coefficients use a different spatial domain precoder.

A forty-fifth aspect, based on the thirty-seventh aspect, wherein each of the one or more CBSR is associated with one or more of: a rank indicator for each of the one or more CSI-RS ports; a corresponding layer supported by each of the one or more CSI-RS port groups.

A forty-sixth aspect, based on the thirty-seventh aspect, further including: means for transmitting, by the base station, a DCI message to the one or more served UEs, wherein the DCI message includes a CBSR indicator configured to identify an indicated CBSR of the one or more CBSR according to which the one or more linear combination coefficients are determined.

A forty-seventh aspect, based on the thirty-seventh aspect, wherein one of the one or more CBSR limits a total number of the one or more linear combination coefficients determined by each UE of the one or more served UEs to a predetermined number.

A forty-eighth aspect may include any combination of the thirty-seventh through the forty-seventh aspects.

A forty-ninth aspect configured for wireless communication may include a non-transitory computer-readable medium having program code recorded thereon, the program code may include program code executable by a computer for causing the computer to receive, by a UE, a CSI report configuration from a serving base station, wherein the CSI report configuration includes configuration of a plurality of CSI-RS port groups, each CSI-RS port group of the plurality of CSI-RS port groups including one or more CSI-RS ports, and wherein each CSI-RS port group is associated with one or more CBSR; program code executable by the computer for causing the computer to determine, by the UE, one or more linear combination coefficients based on channel measurements of one or more CSI-RS port groups of the plurality of CSI-RS port groups, wherein the one or more linear combination coefficients are determined according to the one or more CBSR associated with the one or more CSI-RS port groups; and program code executable by the computer for causing the computer to report, by the UE, a CSI report to the serving base station, wherein the CSI report includes the one or more linear combination coefficients.

A fiftieth aspect, based on the forty-ninth aspect, further including: program code executable by the computer for causing the computer to determine, by the UE, the one or more CSI-RS ports within each CSI-RS port group using a CSI-RS port parameter within the CSI report configuration.

A fifty-first aspect, based on the fiftieth aspect, wherein the one or more CSI-RS ports identified by the CSI-RS port parameter are one of: a same set of the one or more CSI-RS ports for each layer supported by the each CSI-RS port group; or a different set of the one or more CSI-RS ports for the each layer.

A fifty-second aspect based on the fiftieth aspect, further including: program code executable by the computer for causing the computer to identify, by the UE, a set of selected CSI-RS ports within the each CSI-RS port group based on a port selection identifier indicated in the CSI-report configuration, wherein the port selection identifier includes one of: a total number of selected CSI-RS ports applied proportionally by the UE to the each CSI-RS port group; or a per group selected port indicator identifying a per group number of selected CSI-RS ports per the each CSI-RS port group.

A fifty-third aspect, based on the forty-ninth aspect, wherein the one or more CBSR include at least a CBSR for wideband frequency domain basis linear combination coefficient and a CBSR for a plurality of subband frequency domain bases linear combination coefficients.

A fifty-fourth aspect, based on the fifty-third aspect, wherein the program code executable by the computer for causing the computer to determine the one or more CSI-RS ports includes: program code executable by the computer for causing the computer to determine a selected number of CSI-RS ports, b, of an identified CSI-RS port group of the one or more CSI-RS port groups, wherein the program code executable by the computer for causing the computer to determine the one or more linear combination coefficients includes: program code executable by the computer for causing the computer to generate a feedback matrix including a set of frequency domain bases linear combination coefficients of the one or more linear combination coefficients based on the channel measurements of the selected number of CSI-RS ports, wherein the identified CSI port group is associated with the CBSR for the plurality of subband frequency domain bases linear combination coefficients, wherein the feedback matrix includes M columns, where M represents a number of frequency domain bases selected for the set of frequency domain bases linear combination coefficients, and wherein each coefficient of the set of frequency domain bases linear combination coefficients in a first column of the feedback matrix corresponds to a non-zero coefficient and one or more additional non-zero coefficients are provided in one or more entries in a second column through an $M^{th}$ column of the feedback matrix; and program code executable by the computer for causing the computer to generate a coefficient bit map having b(M−1) bits, wherein the coefficient bit map indicates each of the one or more additional non-zero coefficients in the second column through the $M^{th}$ column of the feedback matrix, and wherein the CSI report includes the coefficient bit map.

A fifty-fifth aspect, based on the fifty-third aspect, wherein at least one CBSR of the CBSR for the plurality of subband frequency domain bases linear combination coefficients restricts the frequency domain basis range to a subset of frequency domain basis hypotheses less than a total number of candidate frequency domain basis hypotheses.

A fifty-sixth aspect, based on the fifty-third aspect, wherein each of the one or more CSI-RS ports of the each CSI-RS port group associated with the at least one CBSR for wideband frequency domain basis linear combination coefficient and each other of the one or more CSI-RS ports of the each CSI-RS port group associated with the at least one CBSR for the plurality of subband frequency domain bases linear combination coefficients use a different spatial domain precoder.

A fifty-seventh aspect, based on the forty-ninth aspect, wherein each of the one or more CBSR is associated with one or more of: a rank indicator for each of the one or more CSI-RS ports; or a corresponding layer supported by each of the one or more CSI-RS port groups.

A fifty-eighth aspect, based on the forty-ninth aspect, wherein the program code executable by the computer for causing the computer to determine the one or more linear combination coefficients includes: program code executable by the computer for causing the computer to receive a DCI message from the serving base station, wherein the DCI message includes a CBSR indicator; and program code executable by the computer for causing the computer to select an indicated CBSR of the one or more CBSR using the CBSR indicator, wherein the one or more linear combination coefficients are determined according to the indicated CBSR.

A fifty-ninth aspect, based on the forty-ninth aspect, wherein one of the one or more CBSR limits a total number of the one or more linear combination coefficients to a predetermined number.

A sixtieth aspect may include any combination of the forty-ninths through the fifty-ninth aspects.

A sixty-first aspect configured for wireless communication includes a non-transitory computer-readable medium having program code recorded thereon, the program code may include program code executable by a computer for causing the computer to generate, by a base station, a CSI report configuration for one or more served UEs, wherein the CSI report configuration includes configuration of a plurality of CSI-RS port groups, each CSI-RS port group of the plurality of CSI-RS port groups including one or more CSI-RS ports, and wherein each CSI-RS port group is associated with one or more CBSR; program code executable by the computer for causing the computer to receive, by the base station, a CSI report including one or more linear combination coefficients from the one or more served UEs based on channel measurements of one or more CSI-RS port groups of the plurality of CSI-RS port groups determined according to the one or more CBSR associated with the one or more CSI-RS port groups; program code executable by the computer for causing the computer to determine, by the base station, a hybrid CSI-RS codebook using the plurality of CSI-RS port groups and the one or more linear combination coefficients; and program code executable by the computer for causing the computer to transmit, by the base station, downlink data encoded with a precoding matrix selected from the hybrid CSI-RS codebook.

A sixty-second aspect, based on the sixty-first aspect, wherein the CSI report configuration further includes: a CSI-RS port parameter configured to identify the one or more CSI-RS ports within each CSI-RS port group.

A sixty-third aspect, based on the sixty-second aspect, wherein the CSI-RS port parameter identifies the one or more CSI-RS ports as one of: a same set of the one or more CSI-RS ports for each layer supported by the each CSI-RS port group; or a different set of the one or more CSI-RS ports for the each layer.

A sixty-fourth aspect, based on the sixty-second aspect, wherein the CSI report configuration further includes: a port selection identifier configured to identify a set of selected CSI-RS ports of the one or more CSI-RS ports for CSI reporting, wherein the port selection identifier includes one of: a total number of selected CSI-RS ports applied proportionally to the each CSI-RS port group; or a per group selected port indicator identifying a per group number of selected CSI-RS ports per the each CSI-RS port group.

A sixty-fifth aspect, based on the sixty-first aspect, wherein the one or more CBSR includes at least a first CBSR for wideband frequency domain basis linear combination coefficient and at least a second CBSR for a plurality of subband frequency domain bases linear combination coefficients, and wherein the one or more linear combination coefficients of the CSI report includes a first set of wideband frequency domain basis linear combination coefficients determined according to the first CBSR and a second set of subband frequency domain bases linear combination coefficients determined according to the second CBSR.

A sixty-sixth aspect, based on the sixty-fifth aspect, wherein the a second set of subband frequency domain bases linear combination coefficients is received as a feedback matrix in the CSI report having b rows and M columns, where b represents a number of ports of the one or more CSI-RS ports selected for CSI reporting and M represents a number of frequency domain bases selected for second set of subband frequency domain bases linear combination coefficients, and wherein each coefficient of the second set of subband frequency domain bases linear combination coefficients in a first column of the feedback matrix corresponds to a non-zero coefficient and one or more additional non-zero coefficients are provided in one or more entries in a second column through an $M^{th}$ column of the feedback matrix, and wherein the CSI report further includes a coefficient bit map having b(M−1) bits, wherein the coefficient bit map indicates to the base station each of the one or more additional non-zero coefficients in the second column through the $M^{th}$ column of the feedback matrix.

A sixty-seventh aspect, based on the sixty-fifth aspect, wherein at least one CBSR of the second CBSR for the plurality of subband frequency domain bases linear combination coefficients restricts the frequency domain basis range to a subset of frequency domain basis hypotheses less than a total number of candidate frequency domain basis hypotheses.

A sixty-eighth aspect, based on the sixty-fifth aspect, wherein each of the one or more CSI-RS ports of the each CSI-RS port group associated with the first CBSR for wideband frequency domain basis linear combination coefficient and each other of the one or more CSI-RS ports of the each CSI-RS port group associated with the second CBSR for the plurality of subband frequency domain bases linear combination coefficients use a different spatial domain precoder.

A sixty-ninth aspect, based on the sixty-first aspect, wherein each of the one or more CBSR is associated with one or more of: a rank indicator for each of the one or more CSI-RS ports; and a corresponding layer supported by each of the one or more CSI-RS port groups.

A seventieth aspect, based on the sixty-first aspect, further including: program code executable by the computer for causing the computer to transmit, by the base station, a DCI message to the one or more served UEs, wherein the DCI message includes a CBSR indicator configured to identify an indicated CBSR of the one or more CBSR according to which the one or more linear combination coefficients are determined.

A seventy-first aspect, based on the sixty-first aspect, wherein one of the one or more CBSR limits a total number of the one or more linear combination coefficients determined by each UE of the one or more served UEs to a predetermined number.

A seventy-second aspect may include any combination of the sixty-first through the seventy-first aspects.

A seventy-third aspect configured for wireless communication includes at least one processor; and a memory coupled to the at least one processor, wherein the at least one processor may be configured to receive, by a UE, a CSI report configuration from a serving base station, wherein the CSI report configuration includes configuration of a plurality of CSI-RS port groups, each CSI-RS port group of the plurality of CSI-RS port groups including one or more CSI-RS ports, and wherein each CSI-RS port group is associated with one or more CBSR; to determine, by the UE, one or more linear combination coefficients based on channel measurements of one or more CSI-RS port groups of the plurality of CSI-RS port groups, wherein the one or more linear combination coefficients are determined according to the one or more CBSR associated with the one or more CSI-RS port groups; and to report, by the UE, a CSI report to the serving base station, wherein the CSI report includes the one or more linear combination coefficients.

A seventy-fourth aspect, based on the seventy-third aspect, further including configuration of the at least one processor to determine, by the UE, the one or more CSI-RS ports within each CSI-RS port group using a CSI-RS port parameter within the CSI report configuration.

A seventy-fifth aspect, based on the seventy-fourth aspect, wherein the one or more CSI-RS ports identified by the CSI-RS port parameter are one of: a same set of the one or more CSI-RS ports for each layer supported by the each CSI-RS port group; or a different set of the one or more CSI-RS ports for the each layer.

A seventy-sixth aspect, based on the seventy-fourth aspect, further including configuration of the at least one processor: to identify, by the UE, a set of selected CSI-RS ports within the each CSI-RS port group based on a port selection identifier indicated in the CSI-report configuration, wherein the port selection identifier includes one of: a total number of selected CSI-RS ports applied proportionally by the UE to the each CSI-RS port group; or a per group selected port indicator identifying a per group number of selected CSI-RS ports per the each CSI-RS port group.

A seventy-seventh aspect, based on the seventy-third aspect, wherein the one or more CBSR include at least a CBSR for wideband frequency domain basis linear combination coefficient and a CBSR for a plurality of subband frequency domain bases linear combination coefficients.

A seventy-eighth aspect, based on the seventy-seventh aspect, wherein the configuration of the at least one processor to determine the one or more CSI-RS ports includes: configuration of the at least one processor to determine a selected number of CSI-RS ports, b, of an identified CSI-RS port group of the one or more CSI-RS port groups, wherein the configuration of the at least one processor to determine the one or more linear combination coefficients includes configuration of the at least one processor: to generate a feedback matrix including a set of frequency domain bases linear combination coefficients of the one or more linear combination coefficients based on the channel measurements of the selected number of CSI-RS ports, wherein the identified CSI port group is associated with the CBSR for the plurality of subband frequency domain bases linear combination coefficients, wherein the feedback matrix includes M columns, where M represents a number of frequency domain bases selected for the set of frequency domain bases linear combination coefficients, and wherein each coefficient of the set of frequency domain bases linear combination coefficients in a first column of the feedback matrix corresponds to a non-zero coefficient and one or more additional non-zero coefficients are provided in one or more entries in a second column through an $M^{th}$ column of the feedback matrix; and to generate a coefficient bit map having $b(M-1)$ bits, wherein the coefficient bit map indicates each of the one or more additional non-zero coefficients in the second column through the $M^{th}$ column of the feedback matrix, and wherein the CSI report includes the coefficient bit map.

A seventy-ninth aspect, based on the seventy-seventh aspect, wherein at least one CBSR of the CBSR for the plurality of subband frequency domain bases linear combination coefficients restricts the frequency domain basis range to a subset of frequency domain basis hypotheses less than a total number of candidate frequency domain basis hypotheses.

An eightieth aspect, based on the seventy-seventh aspect, wherein each of the one or more CSI-RS ports of the each CSI-RS port group associated with the at least one CBSR for wideband frequency domain basis linear combination coefficient and each other of the one or more CSI-RS ports of the each CSI-RS port group associated with the at least one CBSR for the plurality of subband frequency domain bases linear combination coefficients use a different spatial domain precoder.

An eighty-first aspect, based on the seventy-third aspect, wherein each of the one or more CBSR is associated with one or more of: a rank indicator for each of the one or more CSI-RS ports; and a corresponding layer supported by each of the one or more CSI-RS port groups.

An eighty-second aspect, based on the seventy-third aspect, wherein the configuration of the at least one processor to determine the one or more linear combination coefficients includes configuration of the at least one processor: to receive a DCI message from the serving base station, wherein the DCI message includes a CBSR indicator; and to select an indicated CBSR of the one or more CBSR using the CBSR indicator, wherein the one or more linear combination coefficients are determined according to the indicated CBSR.

An eighty-third aspect, based on the seventy-third aspect, wherein one of the one or more CBSR limits a total number of the one or more linear combination coefficients to a predetermined number.

An eighty-fourth aspect may include any combination of the seventy-third through the eighty-third aspects.

An eighty-fifth aspect configured for wireless communication includes at least one processor; and a memory coupled to the at least one processor, wherein the at least one processor may be configured to generate, by a base station, a CSI report configuration for one or more served UEs, wherein the CSI report configuration includes configuration of a plurality of CSI-RS port groups, each CSI-RS port group of the plurality of CSI-RS port groups including one or more CSI-RS ports, and wherein each CSI-RS port group is associated with one or more CBSR; to receive, by the base station, a CSI report including one or more linear combination coefficients from the one or more served UEs based on channel measurements of one or more CSI-RS port groups of the plurality of CSI-RS port groups determined according to the one or more CBSR associated with the one or more CSI-RS port groups; to determine, by the base station, a hybrid CSI-RS codebook using the plurality of CSI-RS port groups and the one or more linear combination coefficients; and to transmit, by the base station, downlink data encoded with a precoding matrix selected from the hybrid CSI-RS codebook.

An eighty-sixth aspect, based on the eighty-fifth aspect, wherein the CSI report configuration further includes: a CSI-RS port parameter configured to identify the one or more CSI-RS ports within each CSI-RS port group.

An eighty-seventh aspect, based on the eighty-sixth aspect, wherein the CSI-RS port parameter identifies the one or more CSI-RS ports as one of: a same set of the one or more CSI-RS ports for each layer supported by the each CSI-RS port group; or a different set of the one or more CSI-RS ports for the each layer.

An eighty-eighth aspect, based on the eighty-sixth aspect, wherein the CSI report configuration further includes: a port selection identifier configured to identify a set of selected CSI-RS ports of the one or more CSI-RS ports for CSI reporting, wherein the port selection identifier includes one of: a total number of selected CSI-RS ports applied proportionally to the each CSI-RS port group; or a per group selected port indicator identifying a per group number of selected CSI-RS ports per the each CSI-RS port group.

An eighty-ninth aspect, based on the eighty-fifth aspect, wherein the one or more CBSR includes at least a first CBSR for wideband frequency domain basis linear combination coefficient and at least a second CBSR for a plurality of subband frequency domain bases linear combination coefficients, and wherein the one or more linear combination coefficients of the CSI report includes a first set of wideband frequency domain basis linear combination coefficients determined according to the first CBSR and a second set of subband frequency domain bases linear combination coefficients determined according to the second CBSR.

A ninetieth aspect, based on the eighty-ninth aspect, wherein the a second set of subband frequency domain bases linear combination coefficients is received as a feedback matrix in the CSI report having b rows and M columns, where b represents a number of ports of the one or more CSI-RS ports selected for CSI reporting and M represents a number of frequency domain bases selected for second set of subband frequency domain bases linear combination coefficients, and wherein each coefficient of the second set of subband frequency domain bases linear combination coefficients in a first column of the feedback matrix corresponds to a non-zero coefficient and one or more additional non-zero coefficients are provided in one or more entries in a second column through an $M^{th}$ column of the feedback matrix, and wherein the CSI report further includes a coefficient bit map having $b(M-1)$ bits, wherein the coefficient bit map indicates to the base station each of the one or more additional non-zero coefficients in the second column through the $M^{th}$ column of the feedback matrix.

A ninety-first aspect, based on the eighty-ninth aspect, wherein at least one CBSR of the second CBSR for the plurality of subband frequency domain bases linear combination coefficients restricts the frequency domain basis range to a subset of frequency domain basis hypotheses less than a total number of candidate frequency domain basis hypotheses.

A ninety-second aspect, based on the eighty-ninth aspect, wherein each of the one or more CSI-RS ports of the each CSI-RS port group associated with the first CBSR for wideband frequency domain basis linear combination coefficient and each other of the one or more CSI-RS ports of the each CSI-RS port group associated with the second CBSR for the plurality of subband frequency domain bases linear combination coefficients use a different spatial domain precoder.

A ninety-third aspect, based on the eighty-fifth aspect, wherein each of the one or more CBSR is associated with one or more of: a rank indicator for each of the one or more CSI-RS ports; and a corresponding layer supported by each of the one or more CSI-RS port groups.

A ninety-fourth aspect, based on the eighty-fifth aspect, further including configuration of the at least one processor to transmit, by the base station, a downlink control information (DCI) message to the one or more served UEs, wherein the DCI message includes a CBSR indicator configured to identify an indicated CBSR of the one or more CBSR according to which the one or more linear combination coefficients are determined.

A ninety-fifth aspect, based on the eighty-fifth aspect, wherein one of the one or more CBSR limits a total number of the one or more linear combination coefficients determined by each UE of the one or more served UEs to a predetermined number.

A ninety-sixth aspect may include any combination of the eighty-fifth through the ninety-fifth aspects.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method of wireless communication, comprising:

receiving, by a user equipment (UE), a channel state information (CSI) report configuration from a serving base station, wherein the CSI report configuration includes configuration of a plurality of CSI-reference signal (CSI-RS) port groups, each CSI-RS port group of the plurality of CSI-RS port groups including one or more CSI-RS ports, and wherein each CSI-RS port group is associated with one or more codebook subset restrictions (CBSR), the one or more CBSR including a CBSR for wideband frequency domain basis linear combination coefficient and a CBSR for a plurality of subband frequency domain bases linear combination coefficients;

determining, by the UE, one or more linear combination coefficients based on channel measurements of one or more CSI-RS port groups of the plurality of CSI-RS port groups, wherein the one or more linear combination coefficients are determined according to the one or more CBSR associated with the one or more CSI-RS port groups; and reporting, by the UE, a CSI report to the serving base station, wherein the CSI report includes the one or more linear combination coefficients.

2. The method of claim 1, further including:

determining, by the UE, the one or more CSI-RS ports within each CSI-RS port group using a CSI-RS port parameter within the CSI report configuration.

3. The method of claim 2, wherein the one or more CSI-RS ports identified by the CSI-RS port parameter are one of:

a same set of the one or more CSI-RS ports for each layer supported by each CSI-RS port group; or a different set of the one or more CSI-RS ports for each layer.

4. The method of claim 2, further including:

identifying, by the UE, a set of selected CSI-RS ports within each CSI-RS port group based on a port selection identifier indicated in the CSI report configuration, wherein the port selection identifier includes one of:

a total number of selected CSI-RS ports applied proportionally by the UE to each CSI-RS port group; or a per group selected port indicator identifying a per group number of selected CSI-RS ports per each CSI-RS port group.

5. The method of claim 1, wherein the determining the one or more CSI-RS ports includes:

determining a selected number of CSI-RS ports, b, of an identified CSI-RS port group of the one or more CSI-RS port groups, wherein the determining the one or more linear combination coefficients includes:

generating a feedback matrix including a set of frequency domain bases linear combination coefficients of the one or more linear combination coefficients based on the channel measurements of the selected number of CSI-RS ports, wherein the identified CSI port group is associated with the CBSR for the plurality of subband frequency domain bases linear combination coefficients, wherein the feedback matrix includes M columns, where M represents a number of frequency domain bases selected for the set of frequency domain bases linear combination coefficients, and wherein each coefficient of the set of frequency domain bases linear combination coefficients in a first column of the feedback matrix corresponds to a non-zero coefficient and one or more additional non-zero coefficients are provided in one or more entries in a second column through an $M^{th}$ column of the feedback matrix; and generating a coefficient bit map having b(M−1) bits, wherein the coefficient bit map indicates each of the one or more additional non-zero coefficients in the second column through the $M^{th}$ column of the feedback matrix, and wherein the CSI report includes the coefficient bit map.

6. The method of claim 1, wherein at least one CBSR of the CBSR for the plurality of subband frequency domain bases linear combination coefficients restricts the frequency domain basis range to a subset of frequency domain basis hypotheses less than a total number of candidate frequency domain basis hypotheses.

7. The method of claim 1, wherein each of the one or more CSI-RS ports of each CSI-RS port group associated with the CBSR for wideband frequency domain basis linear combination coefficient and each other of the one or more CSI-RS ports of each CSI-RS port group associated with the CBSR for the plurality of subband frequency domain bases linear combination coefficients use a different spatial domain precoder.

8. The method of claim 1, wherein each of the one or more CBSR is associated with one or more of:

a rank indicator for each of the one or more CSI-RS ports; and a corresponding layer supported by each of the one or more CSI-RS port groups.

9. The method of claim 1, wherein the determining the one or more linear combination coefficients includes:

receiving a downlink control information (DCI) message from the serving base station, wherein the DCI message includes a CBSR indicator; and selecting an indicated CBSR of the one or more CBSR using the CBSR indicator, wherein the one or more linear combination coefficients are determined according to the indicated CBSR.

10. An apparatus configured for wireless communication, the apparatus comprising:

at least one processor; and a memory coupled to the at least one processor, wherein the at least one processor is configured:

to receive, by a user equipment (UE), a channel state information (CSI) report configuration from a serving base station, wherein the CSI report configuration includes configuration of a plurality of CSI-reference signal (CSI-RS) port groups, each CSI-RS port group of the plurality of CSI-RS port groups including one or more CSI-RS ports, and wherein each CSI-RS port group is associated with one or more codebook subset restrictions (CBSR), the one or more CBSR including a CBSR for wideband frequency domain basis linear combination coefficient and a CBSR for a plurality of subband frequency domain bases linear combination coefficients;

to determine, by the UE, one or more linear combination coefficients based on channel measurements of one or more CSI-RS port groups of the plurality of CSI-RS port groups, wherein the one or more linear combination coefficients are determined according to the one or more CBSR associated with the one or more CSI-RS port groups; and to report, by the UE, a CSI report to the serving base station, wherein the CSI report includes the one or more linear combination coefficients.

11. The apparatus of claim 10, further including configuration of the at least one processor to determine, by the UE, the one or more CSI-RS ports within each CSI-RS port group using a CSI-RS port parameter within the CSI report configuration.

12. The apparatus of claim 11, wherein the one or more CSI-RS ports identified by the CSI-RS port parameter are one of:

a same set of the one or more CSI-RS ports for each layer supported by each CSI-RS port group; or a different set of the one or more CSI-RS ports for each layer.

13. The apparatus of claim 11, further including configuration of the at least one processor:

to identify, by the UE, a set of selected CSI-RS ports within each CSI-RS port group based on a port selection identifier indicated in the CSI report configuration, wherein the port selection identifier includes one of:

a total number of selected CSI-RS ports applied proportionally by the UE to each CSI-RS port group; or a per group selected port indicator identifying a per group number of selected CSI-RS ports per each CSI-RS port group.

14. The apparatus of claim 10, wherein the configuration of the at least one processor to determine the one or more CSI-RS ports includes: configuration of the at least one processor to determine a selected number of CSI-RS ports, b, of an identified CSI-RS port group of the one or more CSI-RS port groups, wherein the configuration of the at least one processor to determine the one or more linear combination coefficients includes configuration of the at least one processor:

to generate a feedback matrix including a set of frequency domain bases linear combination coefficients of the one or more linear combination coefficients based on the channel measurements of the selected number of CSI-RS ports, wherein the identified CSI port group is associated with the CBSR for the plurality of subband frequency domain bases linear combination coefficients, wherein the feedback matrix includes M columns, where M represents a number of frequency domain bases selected for the set of frequency domain bases linear combination coefficients, and wherein each coefficient of the set of frequency domain bases linear combination coefficients in a first column of the feedback matrix corresponds to a non-zero coefficient and one or more additional non-zero coefficients are provided in one or more entries in a second column through an $M^{th}$ column of the feedback matrix; and to generate a coefficient bit map having b(M−1) bits, wherein the coefficient bit map indicates each of the one or more additional non-zero coefficients in the second column through the $M^{th}$ column of the feedback matrix, and wherein the CSI report includes the coefficient bit map.

15. The apparatus of claim 10, wherein at least one CBSR of the CBSR for the plurality of subband frequency domain bases linear combination coefficients restricts the frequency domain basis range to a subset of frequency domain basis hypotheses less than a total number of candidate frequency domain basis hypotheses.

16. The apparatus of claim 10, wherein each of the one or more CSI-RS ports of each CSI-RS port group associated with the CBSR for wideband frequency domain basis linear combination coefficient and each other of the one or more CSI-RS ports of each CSI-RS port group associated with the CBSR for the plurality of subband frequency domain bases linear combination coefficients use a different spatial domain precoder.

17. The apparatus of claim 10, wherein each of the one or more CBSR is associated with one or more of:

a rank indicator for each of the one or more CSI-RS ports; and a corresponding layer supported by each of the one or more CSI-RS port groups.

18. The apparatus of claim 10, wherein the configuration of the at least one processor to determine the one or more linear combination coefficients includes configuration of the at least one processor:

to receive a downlink control information (DCI) message from the serving base station, wherein the DCI message includes a CBSR indicator; and to select an indicated CBSR of the one or more CBSR using the CBSR indicator, wherein the one or more linear combination coefficients are determined according to the indicated CBSR.

19. The apparatus of claim 10, wherein one of the one or more CBSR limits a total number of the one or more linear combination coefficients to a predetermined number.

20. An apparatus configured for wireless communication, the apparatus comprising:

at least one processor; and a memory coupled to the at least one processor, wherein the at least one processor is configured:

to generate, by a base station, a channel state information (CSI) report configuration for one or more served user equipments (UEs), wherein the CSI report configuration includes configuration of a plurality of CSI-reference signal (CSI-RS) port groups, each CSI-RS port group of the plurality of CSI-RS port groups including one or more CSI-RS ports, and wherein each CSI-RS port group is associated with one or more codebook subset restrictions (CBSR), the one or more CBSR including a CBSR for wideband frequency domain basis linear combination coefficient and a CBSR for a plurality of subband frequency domain bases linear combination coefficients;

to receive, by the base station, a CSI report including one or more linear combination coefficients from the one or more served UEs based on channel measurements of one or more CSI-RS port groups of the plurality of CSI-RS port groups determined according to the one or more CBSR associated with the one or more CSI-RS port groups;

to determine, by the base station, a hybrid CSI-RS codebook using the plurality of CSI-RS port groups and the one or more linear combination coefficients; and to transmit, by the base station, downlink data encoded with a precoding matrix selected from the hybrid CSI-RS codebook.

21. The apparatus of claim 20, wherein the CSI report configuration further includes:

a CSI-RS port parameter configured to identify the one or more CSI-RS ports within each CSI-RS port group.

22. The apparatus of claim 21, wherein the CSI-RS port parameter identifies the one or more CSI-RS ports as one of:

a same set of the one or more CSI-RS ports for each layer supported by each CSI-RS port group; or a different set of the one or more CSI-RS ports for each layer.

23. The apparatus of claim 21, wherein the CSI report configuration further includes:

a port selection identifier configured to identify a set of selected CSI-RS ports of the one or more CSI-RS ports for CSI reporting, wherein the port selection identifier includes one of:

a total number of selected CSI-RS ports applied proportionally to each CSI-RS port group; or a per group selected port indicator identifying a per group number of selected CSI-RS ports per each CSI-RS port group.

24. The apparatus of claim 20, wherein the one or more linear combination coefficients of the CSI report includes a first set of wideband frequency domain basis linear combination coefficients determined according to the CBSR for the wideband frequency domain basis linear combination coefficient and a second set of subband frequency domain bases linear combination coefficients determined according to the CBSR for the plurality of subband frequency domain bases linear combination coefficient.

25. The apparatus of claim 24, wherein the a second set of subband frequency domain bases linear combination coefficients is received as a feedback matrix in the CSI report having b rows and M columns, where b represents a number of ports of the one or more CSI-RS ports selected for CSI reporting and M represents a number of frequency domain bases selected for second set of subband frequency domain bases linear combination coefficients, and wherein each coefficient of the second set of subband frequency domain bases linear combination coefficients in a first column of the feedback matrix corresponds to a non-zero coefficient and one or more additional non-zero coefficients are provided in one or more entries in a second column through an $M^{th}$ column of the feedback matrix, and wherein the CSI report further includes a coefficient bit map having $b(M-1)$ bits, wherein the coefficient bit map indicates to the base station each of the one or more additional non-zero coefficients in the second column through the $M^{th}$ column of the feedback matrix.

26. The apparatus of claim 24, wherein at least one CBSR of the CBSR for the plurality of subband frequency domain bases linear combination coefficients restricts the frequency domain basis range to a subset of frequency domain basis hypotheses less than a total number of candidate frequency domain basis hypotheses.

27. The apparatus of claim 24, wherein each of the one or more CSI-RS ports of each CSI-RS port group associated with the CBSR for wideband frequency domain basis linear combination coefficient and each other of the one or more CSI-RS ports of each CSI-RS port group associated with the CBSR for the plurality of subband frequency domain bases linear combination coefficients use a different spatial domain precoder.

28. The apparatus of claim 20, wherein each of the one or more CBSR is associated with one or more of:

a rank indicator for each of the one or more CSI-RS ports; and a corresponding layer supported by each of the one or more CSI-RS port groups.

29. The apparatus of claim 20, further including configuration of the at least one processor to transmit, by the base station, a downlink control information (DCI) message to the one or more served UEs, wherein the DCI message includes a CBSR indicator configured to identify an indicated CBSR of the one or more CBSR according to which the one or more linear combination coefficients are determined.

30. The apparatus of claim 20, wherein one of the one or more CBSR limits a total number of the one or more linear combination coefficients determined by each UE of the one or more served UEs to a predetermined number.

31. The method of claim 1, further comprising:

generating the CSI report based on a feedback matrix, wherein the feedback matrix includes a set of frequency domain bases linear combination coefficients of the one or more linear combination coefficients based on the channel measurements of a selected number of CSI-RS ports of an identified CSI-RS port group of the one or more CSI-RS port groups.

32. The method of claim 1, wherein the CBSR for wideband frequency domain basis linear combination coefficient restricts one CSI-RS port group to a first DFT vector defining a frequency basis and the CBSR for the plurality of subband frequency domain bases linear combination coefficients restricts at least one second CSI-RS port group to selection from a plurality of subband frequency domain bases.

33. The method of claim 1, wherein the plurality of CSI-RS port groups includes a first port group and a second port group each having a different amount of CSI-RS ports.

\* \* \* \* \*